US010377677B2

(12) United States Patent
Weaver et al.

(10) Patent No.: US 10,377,677 B2
(45) Date of Patent: Aug. 13, 2019

(54) FERTILIZER COMPOSITIONS AND METHODS OF MAKING AND USING THE SAME

(71) Applicant: Alcoa USA Corp., Pittsburgh, PA (US)

(72) Inventors: Mark L. Weaver, Greenwell Springs, LA (US); Kyle A. Crum, Oakmont, PA (US); Judodine Nichols, Murrysville, PA (US); David F. Iwig, Greensburg, PA (US); Steven C. Orkis, Pittsburgh, PA (US); Gerald E. Carkin, Tarentum, PA (US); Deniz Gencaga, Pittsburgh, PA (US); Stephen P. Sunday, Richmond, VA (US); Ian Ross Harrison, Port Kennedy (AU); John R. Smith, Pittsburgh, PA (US); Shannon I. Parks, Sarver, PA (US); Mikhail Gershenzon, Murrysville, PA (US)

(73) Assignee: Alcoa USA Corp., Pittsburgh, PA (US)

( * ) Notice: Subject to any disclaimer, the term of this patent is extended or adjusted under 35 U.S.C. 154(b) by 0 days.

(21) Appl. No.: 15/823,213

(22) Filed: Nov. 27, 2017

(65) Prior Publication Data
US 2018/0079692 A1  Mar. 22, 2018

Related U.S. Application Data

(60) Continuation of application No. 15/479,923, filed on Apr. 5, 2017, now abandoned, which is a division of
(Continued)

(51) Int. Cl.
*C05C 1/00* (2006.01)
*C05G 3/00* (2006.01)
(Continued)

(52) U.S. Cl.
CPC ............... *C05C 1/02* (2013.01); *C05B 17/00* (2013.01); *C05C 1/00* (2013.01); *C05G 3/00* (2013.01);
(Continued)

(58) Field of Classification Search
None
See application file for complete search history.

(56) References Cited

U.S. PATENT DOCUMENTS 2,991,170 A * 7/1961 Szepesi .................... C05C 1/00
502/408
3,034,858 A * 5/1962 Vives ........................ B01J 2/30
252/383
(Continued)

FOREIGN PATENT DOCUMENTS

CN 103922854 * 7/2014
RU 2185353 C1 7/2002
(Continued)

*Primary Examiner* — Wayne A Langel
(74) *Attorney, Agent, or Firm* — Greenberg Traurig, LLP

(57) ABSTRACT

Generally, the instant disclosure relates to fertilizer compositions and methods of making and using the same. More specifically, the instant disclosure relates to blast suppressant and/or blast resistant ammonium nitrate fertilizer compositions, as well as methods of making and using the same.

20 Claims, 20 Drawing Sheets

Related U.S. Application Data application No. 15/155,319, filed on May 16, 2016, now Pat. No. 9,630,886, which is a division of application No. 14/539,745, filed on Nov. 12, 2014, now Pat. No. 9,527,779.

(60) Provisional application No. 61/909,625, filed on Nov. 27, 2013, provisional application No. 61/903,293, filed on Nov. 12, 2013.

(51) Int. Cl.
*C05C 1/02* (2006.01)
*C05B 17/00* (2006.01)

(52) U.S. Cl.
CPC ......... *C05G 3/0041* (2013.01); *C05G 3/0047* (2013.01)

(56) References Cited

U.S. PATENT DOCUMENTS

| | | | | |
|---|---|---|---|---|
| 3,137,565 | A * | 6/1964 | Hayes | C05B 1/02 23/313 R |
| 8,075,660 | B2 * | 12/2011 | Kweeder | C05C 1/02 423/396 |
| 9,527,779 | B2 * | 12/2016 | Weaver | C05C 1/00 |
| 9,630,886 | B2 * | 4/2017 | Weaver | C05C 1/00 |
| 2013/0012383 | A1 * | 1/2013 | Huffer | C05B 1/00 504/101 |

FOREIGN PATENT DOCUMENTS

| | | |
|---|---|---|
| RU | 2008132337 A | 2/2010 |
| WO | 2007/084873 A2 | 7/2007 |
| WO | 2012/021669 A2 | 2/2012 |

\* cited by examiner

FERTILIZER COMPOSITIONS AND METHODS OF MAKING AND USING THE SAME

CROSS-REFERENCE TO RELATED APPLICATIONS

This patent application is a continuation of U.S. patent application Ser. No. 15/479,923 filed Apr. 5, 2017, which is a divisional of U.S. patent application Ser. No. 15/155,319 filed May 16, 2016, which is a divisional of U.S. patent application Ser. No. 14/539,745 filed Nov. 12, 2014, now U.S. Pat. No. 9,527,779, which is a non-provisional of and claims priority to U.S. Patent Application No. 61/903,293 filed Nov. 12, 2013, and U.S. Patent Application No. 61/909,625 filed Nov. 27, 2013, all of which are incorporated herein by reference in their entirety.

FIELD OF THE INVENTION

Generally, the instant disclosure relates to fertilizer compositions and methods of making and using the same. More specifically, the instant disclosure relates to blast suppressant and/or blast resistant ammonium nitrate fertilizer compositions, as well as methods of making and using the same.

BACKGROUND

Ammonium Nitrate (AN) fertilizer, combined with fuel oil (ANFO) or other fuels is a common explosive used throughout the world. Unfortunately, due to the availability of ammonium nitrate and fuels (such as fuel oil, powdered sugar, or aluminum powder), malicious parties (e.g. terrorists) are able to obtain these materials and utilize them in explosives (i.e. bombs and improvised explosive devices).

SUMMARY OF THE INVENTION

Various embodiments of the instant disclosure provide for stabilizer materials to ammonium nitrate fertilizer that reduce, prevent, and/or eliminate the unauthorized use of ammonium nitrate to construct ANFO type explosives. Broadly, the instant disclosure is directed towards: fertilizer compositions and methods of making the same, in which, due to the composition, the fertilizer comprises a blast suppression (e.g. measured via specific impulse) and/or desensitization (e.g. measured via unconfined critical diameter and/or booster quantity needed to initiate detonation) as compared to existing ammonium nitrate fertilizer(s).

In one aspect, a fertilizer composition is provided, comprising: an ammonium nitrate material; and an effective amount of a stabilizer material to result in a specific impulse of not greater than 13.5 kPa*ms/kg when measured in accordance with a blast propagation test; wherein the stabilizer material comprises a metal (e.g. aluminum) production byproduct wherein the stabilizer material is at least 5 wt. % of the total fertilizer composition.

In some embodiments, the stabilizer material comprises an aluminum production byproduct.

In some embodiments, the stabilizer material comprises an additive.

In some embodiments, the fertilizer composition comprises a controlled release fertilizer, wherein less than 20 wt. % of the nitrogen content of the fertilizer is released in a 24 hour period. In some embodiments, the fertilizer comprises a controlled release fertilizer in that not less than 50 wt. % of the nitrogen content of the fertilizer is released in a seven day period. In some embodiments, the fertilizer comprises a controlled release fertilizer in that not less than 80 wt. % of the nitrogen content of the fertilizer is released in a 30 day period.

In another aspect, a fertilizer composition is provided, comprising: an ammonium nitrate material; and an effective amount of a stabilizer material to result in a specific impulse of not greater than 13.5 kPa*ms/kg when measured in accordance with a blast propagation test; wherein the stabilizer material is selected from the group consisting of: BR; LDH; HTC; apatite; bauxite; phosphate compounds; salts of organic acids; red lime; TCA; aluminum hydroxide; SGA, ESP; and combinations thereof; wherein the stabilizer material is at least 5 wt. % of the total fertilizer composition.

In yet another aspect, a fertilizer composition is provided, comprising: an ammonium nitrate material; and an effective amount of a stabilizer material comprising layered double hydroxide (LDH) material to result in a specific impulse of not greater than 12 kPa*ms/kg when tested in accordance with a blast propagation test; wherein the LDH material is at least 10 wt. % of the total fertilizer composition.

In still another aspect, a fertilizer composition is provided, comprising: ammonium nitrate material; and an effective amount of a stabilizer material comprising: a layered double hydroxide composition (e.g. HTC) and bauxite residue; to result in a specific impulse of not greater than 3 kPa*ms/kg when tested in accordance with a blast propagation test; wherein the combination of LDH and BR comprise not greater than 25 wt. % of the fertilizer composition.

In another aspect, a fertilizer composition is provided, comprising: an ammonium nitrate material; and an effective amount of stabilizer material comprising apatite to result in a specific impulse of not greater than 6 kPa*ms/kg when tested in accordance with a blast propagation test, wherein the apatite comprises no greater than 25 wt % of the fertilizer composition.

In some embodiments, one or more fertilizer compositions of the instant disclosure provide for pH adjustment of the soil.

In some embodiments, fertilizer compositions of the instant disclosure provide for slow release of the fertilizer compounds (as compared to AN fertilizer).

As used herein, "AN-type explosive" means: ammonium nitrate-based fuel explosives, where fuels include fuel oil (ANFO-type explosives) or other fuels like powdered sugar or aluminum powder.

As used herein, "fertilizer" means: a substance used to make soil more fertile. In some embodiments of the instant disclosure, a fertilizer includes ammonium nitrate. In other embodiments, fertilizer is ammonium nitrate fertilizer which includes at least one stabilizer material, where the stabilizer material is present in a specified amount so as the resulting specific impulse of the fertilizer is not greater than a predetermined threshold, when measured in accordance with a blast propagation test.

As used herein, "form" means: the shape or structure of something (as distinguished from its material composition). As some non-limiting examples, the fertilizer form includes: pellets, prills, granules, powder, and combinations thereof.

In some embodiments, the fertilizer composition of the instant disclosure is in a single form (i.e. pellets, prills, granules, disks, or powder). In some embodiments, the fertilizer composition of the instant disclosure is in multiple forms (i.e. a mixture of two or more forms, including pellets, prills, granules, disks, or powder).

In some embodiments, the fertilizer composition comprises: a mesh size of 4, a mesh size of 6, a mesh size of 8, a mesh size of 10, a mesh size of 12, a mesh size of 14, a mesh size of 16, a mesh size of 18, or a mesh size of 20.

In some embodiments, the fertilizer composition comprises: a mesh size of 20, a mesh size of 30, a mesh size of 40, a mesh size of 50, a mesh size of 60, a mesh size of 70, a mesh size of 80, a mesh size of 90, or a mesh size of 100.

As used herein, "prill" means: a pellet formed by generating droplets allowing the drops to solidify. In some embodiments, the stabilizer material(s) is/are added ammonium nitrate prior to prilling. In some embodiments, the stabilizer material (s) is/are added to ammonium nitrate after prilling (i.e. co-prilling or coating after the AN product is prilled).

In some embodiments, the mesh size of a prill product is between 4 and 20 mesh (i.e. ~4700 microns-~830 microns).

As used herein, "pellet" means a rounded body (e.g. spherical, cylindrical). In some embodiments, the ammonium nitrate and stabilizer material (s) are ground (e.g. milled), mixed, and then pelletized together to form a pellet containing both AN and stabilizer material (s) therein at a desired weight percentage. In some embodiments, the mesh size of a pellet product is between 4 and 20 mesh.

As used herein, "powder" means: matter in a finely divided state. In some embodiments, the ammonium nitrate and stabilizer material (s) are ground (either independently or in combination) to yield a powder product having a particular average particle size. In some embodiments, the mesh size of a powder product is greater than 20 mesh.

As used herein, "granule" means: a small particle. In some embodiments, the ammonium nitrate is crushed (i.e. reduced in size from prilled or pellet form) into smaller pieces (which are particulate in form as opposed to powder). In some embodiments, the ammonium nitrate is combined with the stabilizer material(s) during the ammonium nitrate production process to form a composition having both ammonium nitrate and stabilizer material(s) therein. In some embodiments, the mesh size of a granule product is between 4 and 20 mesh.

In some embodiments, the fertilizer composition comprises a homogenous mixture.

In some embodiments, the fertilizer composition comprises a heterogeneous mixture.

In some embodiments, the fertilizer compositions include: uncoated materials, coated materials, and/or multi-coated materials (i.e. more than one coating).

Generally, addition of a stabilizer material in accordance with the instant disclosure causes blast suppression and/or a desensitization of the resulting fertilizer composition.

As used herein, "blast suppression" means: the reduction of a materials tendency to explode (as measured by specific impulse).

As used herein, "blast suppression test" means a test to measure the quantity and/or quality of blast suppression of an underlying stabilizer material present in a fertilizer composition for a given mesh size (e.g. 20, 40, or 60 mesh). In some embodiments, blast suppression test means a test article set atop a witness plate, where the test article houses a fertilizer composition (which includes the stabilizer material) and a detonator (C4 booster) placed adjacent to the top end of the test article. In some embodiments, overpressure sensors positioned a set distance from the test article are used to quantify the specific impulse of the blast. In some embodiments, the witness plate is used to obtain qualitative data from the blast (perforation means a detonation of fertilizer composition occurred, non-perforation means no detonation of the fertilizer composition occurred). In some embodiments, variables like test article diameter, booster quantity, and fuel oil quantity are used to obtain desensitization measurements (i.e. an increase in diameter of the test article to account for an increase in unconfined critical diameter, an increase in booster quantity required to detonate the fertilizer composition, an increase in fuel oil in the fertilizer composition, and/or combinations thereof)

As used herein, "pressure impulse" refers to the amount of pressure measured during a detonation of an explosive (e.g. measured in Pa*ms). In some embodiments, impulse pressure (sometimes called detonation pressure) is measured with overpressure sensors.

As used herein, "specific impulse" means: an amount of force a material has per unit of time with respect to an amount of explosive used (e.g. measured in units of kPa*ms/kg). For example, the higher the impulse, the greater the blast/detonation of the blast media (e.g. fertilizer as measured at a distance of 7 m).

In some embodiments, specific impulse is utilized as a variable to express the characteristic of blast suppression (i.e. reduction, prevention, or elimination of a material's tendency to detonate/explode) for stabilizer materials in accordance with the various embodiments of the instant disclosure.

In some embodiments, the specific impulse of a fertilizer composition in accordance with the embodiments of the instant disclosure is less than the specific impulse of an ammonium nitrate fertilizer (e.g. where commercially available fertilizer has an ammonium nitrate content of about 98-100% AN).

Specific Impulse is calculated via the following formula:

$$\text{Specific impulse} = ((\text{Impulse}_{Total} - \text{Impulse}_{Booster})/(1-\text{Conc.}))/\text{Charge Mass}$$

where $\text{Impulse}_{Total}$ is the average measure of the pressure sensors (overpressure sensors), which is corrected for: (a) the booster (i.e. $\text{Impulse}_{Booster}$), (b) the mass of the charge (measured value), and (c) the % dilution (measured value).

In some embodiments (e.g. with reference to the blast tests completed in the Examples sections), as the blast components were prepared, there is some level of variability in the specific impulse values obtained for the "same" materials. Without being bound by a particular mechanism or theory, non-limiting examples of possible sources of error or variation include: variability in the packing of the materials, environment of testing, time of day of blast, mixing of the material, humidity, cloud cover, makeup of the fertilizer itself, and combinations thereof.

For example, without being bound by a particular mechanism or theory, variability in packing of the materials is believed to potentially result in varying amount of voids in different samples for the same material, which can result in different specific impulse values for the same materials (e.g. resulting in experimental error and/or outliers).

In some embodiments, the specific impulse of a composition of the instant disclosure is: less than 13.5 kPa*ms/kg; less than 13 kPa*ms/kg; less than 12.5 kPa*ms/kg; less than 12 kPa*ms/kg; less than 11.5 kPa*ms/kg; less than 11 kPa*ms/kg; less than 10.5 kPa*ms/kg; less than 10 kPa*ms/kg; less than 9.5 kPa*ms/kg; less than 9 kPa*ms/kg; less than 8.5 kPa*ms/kg; less than 8 kPa*ms/kg; less than 7.5 kPa*ms/kg; less than 7 kPa*ms/kg; less than 6.5 kPa*ms/kg; less than 6 kPa*ms/kg; less than 5.5 kPa*ms/kg; less than 5 kPa*ms/kg; less than 4.5 kPa*ms/kg; less than 4 kPa*ms/kg; less than 3.5 kPa*ms/kg; less than 3 kPa*ms/kg; less than 2.5 kPa*ms/kg; less than 2 kPa*ms/kg; less than 1.5 kPa*ms/kg; or less than 1 kPa*ms/kg.

In some embodiments, the specific impulse of a composition of the instant disclosure is: less than 1 kPa*ms/kg; less than 0.8 kPa*ms/kg; less than 0.6 kPa*ms/kg; less than 0.5 kPa*ms/kg; less than 0.4 kPa*ms/kg; less than 0.2 kPa*ms/kg; less than 0.1 kPa*ms/kg; less than 0.05 kPa*ms/kg; or less than 0.01 kPa*ms/kg.

In some embodiments, the specific impulse of a composition of the instant disclosure is: not greater than 13.5 kPa*ms/kg; not greater than 13 kPa*ms/kg; not greater than 12.5 kPa*ms/kg; not greater than 12 kPa*ms/kg; not greater than 11.5 kPa*ms/kg; not greater than 11 kPa*ms/kg; not greater than 10.5 kPa*ms/kg; not greater than 10 kPa*ms/kg; not greater than 9.5 kPa*ms/kg; not greater than 9 kPa*ms/kg; not greater than 8.5 kPa*ms/kg; not greater than 8 kPa*ms/kg; not greater than 7.5 kPa*ms/kg; not greater than 7 kPa*ms/kg; not greater than 6.5 kPa*ms/kg; not greater than 6 kPa*ms/kg; not greater than 5.5 kPa*ms/kg; not greater than 5 kPa*ms/kg; not greater than 4.5 kPa*ms/kg; not greater than 4 kPa*ms/kg; not greater than 3.5 kPa*ms/kg; not greater than 3 kPa*ms/kg; not greater than 2.5 kPa*ms/kg; not greater than 2 kPa*ms/kg; not greater than 1.5 kPa*ms/kg; or not greater than 1 kPa*ms/kg.

In some embodiments, the specific impulse of a composition of the instant disclosure is: not greater than 1 kPa*ms/kg; not greater than 0.8 kPa*ms/kg; not greater than 0.6 kPa*ms/kg; not greater than 0.5 kPa*ms/kg; not greater than 0.4 kPa*ms/kg; not greater than 0.2 kPa*ms/kg; not greater than 0.1 kPa*ms/kg; not greater than 0.05 kPa*ms/kg; or not greater than 0.01 kPa*ms/kg.

In some embodiments, a fertilizer composition in accordance with the instant disclosure comprises a specific impulse reduction of: at least a 10% reduction in specific impulse; at least a 15% reduction in specific impulse; at least a 20% reduction in specific impulse; at least a 25% reduction in specific impulse; at least a 30% reduction in specific impulse; at least a 35% reduction in specific impulse; at least a 40% reduction in specific impulse; at least a 45% reduction in specific impulse; at least a 50% reduction in specific impulse; at least a 55% reduction in specific impulse; at least a 60% reduction in specific impulse; at least a 65% reduction in specific impulse; at least a 70% reduction in specific impulse; at least a 75% reduction in specific impulse; at least a 80% reduction in specific impulse; at least a 85% reduction in specific impulse; at least a 90% reduction in specific impulse; or at least a 95% reduction in specific impulse, when compared to the specific impulse of a commercially available ammonium nitrate fertilizer composition.

In some embodiments, a fertilizer composition in accordance with the instant disclosure comprises a specific impulse reduction of: at least a 90% reduction in specific impulse; at least a 92% reduction in specific impulse; at least a 95% reduction in specific impulse; at least a 97% reduction in specific impulse; at least a 98% reduction in specific impulse; at least a 99% reduction in specific impulse; or at least a 99.3% reduction in specific impulse, when compared to the specific impulse of a commercially available ammonium nitrate fertilizer composition.

In some embodiments, a fertilizer composition in accordance with the instant disclosure comprises: not greater than a 10% reduction in specific impulse; not greater than a 15% reduction in specific impulse; not greater than a 20% reduction in specific impulse; not greater than a 25% reduction in specific impulse; not greater than a 30% reduction in specific impulse; not greater than a 35% reduction in specific impulse; not greater than a 40% reduction in specific impulse; not greater than a 45% reduction in specific impulse; not greater than a 50% reduction in specific impulse; not greater than a 55% reduction in specific impulse; not greater than a 60% reduction in specific impulse; not greater than a 65% reduction in specific impulse; not greater than a 70% reduction in specific impulse; not greater than a 75% reduction in specific impulse; not greater than a 80% reduction in specific impulse; not greater than a 85% reduction in specific impulse; not greater than a 90% reduction in specific impulse; not greater than a 95% reduction in specific impulse as compared to a commercially available ammonium nitrate fertilizer composition.

In some embodiments, a fertilizer composition in accordance with the instant disclosure comprises a reduction in specific impulse of: not greater than a 90% reduction in specific impulse; not greater than a 92% reduction in specific impulse; not greater than a 95% reduction in specific impulse; not greater than a 97% reduction in specific impulse; not greater than a 98% reduction in specific impulse; not greater than a 99% reduction in specific impulse; not greater than a 99.3% reduction in specific impulse, when compared to the specific impulse of a commercially available ammonium nitrate fertilizer.

As used herein, "desensitization" means: the reduction in the critical energy of detonation of a material. As a non-limiting example, desensitization results in a material's reduced ability or inability to explode, when given a donor charge (i.e. booster) or when impacted from a fragment. In some embodiments, desensitization is characterized via unconfined critical diameter of the fertilizer composition. In some embodiments, desensitization is quantified by the booster quantity needed to cause an explosion (i.e. or a non-explosive event at a large quantity of booster size).

As used herein, "unconfined critical diameter" means a minimum diameter that a given volume of explosive material must be in, in order to sustain a detonation front (i.e. explode). In some embodiments, unconfined critical diameter is a variable which is used to measure whether a particular stabilizer material or combination of stabilizer materials have the ability to desensitize an ANFO-type material from detonating/exploding.

In some embodiments, when compared to AN fertilizers, fertilizer compositions of the instant disclosure are "desensitized" by: at least a factor of two; at least a factor of three; at least a factor of four; at least a factor of five; at least a factor of six; at least a factor of seven; at least a factor of eight; at least a factor of nine; or at least a factor of ten.

In some embodiments, when compared to AN fertilizers, fertilizer compositions of the instant disclosure are "desensitized" by: not greater than a factor of two; not greater than a factor of three; not greater than a factor of four; not greater than a factor of five; not greater than a factor of six; not greater than a factor of seven; not greater than a factor of eight; not greater than a factor of nine; or not greater than a factor of ten.

As a non-limiting example, in some embodiments, the fertilizer composition increased the unconfined critical diameter (CD) from five inches (for ANFO) to six inches, seven inches, or eight inches.

As used herein, "detonation" means a supersonic exothermic front accelerating through a medium that eventually drives a shock front propagating from it (i.e. directly in front of it).

In some embodiments, the metrics of blast suppression and/or desensitization are measured qualitatively, by visual observation of a witness plate after a test article undergoes blast testing. If the witness plate (i.e. steel plate) is perforated, it indicates that detonation occurred (i.e. both C4 booster charge and the test media—fertilizer composition with fuel oil detonated). If the witness plate is not perforated (including bent plate), it indicates that only the booster charge exploded and the blast did not detonate the media—fertilizer composition in fuel oil.

As used herein, "ammonium nitrate material" (also interchangeably referred to as AN) means: a composition including ammonium nitrate ($NH_4NO_3$). In some embodiments, ammonium nitrate is used in agriculture as a high-nitrogen fertilizer, though AN fertilizer can also be used as an oxidizing agent in explosives (e.g. including improved explosive devices).

As used herein, "stabilizer material" means: a material added to another material to prevent or retard an unwanted alteration of physical state. In some embodiments, a stabilizer material is present with an ammonium nitrate material to provide a fertilizer composition which prevents or retards an unwanted oxidation/explosion of the composition. In some embodiments, the stabilizer material comprises an additive.

As used herein, "additive" means: a substance added to another in defined amounts to effect a desired change in one or more properties. In accordance with the instant disclosure, an additive is added to a fertilizer comprising ammonium nitrate in order to prevent, reduce, or eliminate the ability of the composition to be utilized as a material (e.g. oxidizing material) in an explosive and/or explosive device.

In some embodiments, the presence of a stabilizer material in the fertilizer composition (i.e. at a particular wt. %) prevents the composition from exploding (i.e. when measured in accordance with a blast propagation test). In other embodiments, the presence of a stabilizer material in the fertilizer composition (i.e. at a particular wt. %) reduces the specific impulse of the composition.

In some embodiments, the fertilizer composition comprises: at least 5 wt. % stabilizer material; at least 7 wt. % stabilizer material; at least 10 wt. % of stabilizer material; at least 15 wt. % of stabilizer material; at least 20 wt. % of stabilizer material; at least 25 wt. % of stabilizer material; at least 30 wt. % of stabilizer material; at least 35 wt. % of stabilizer material; at least 40 wt. % of stabilizer material; at least 45 wt. % of stabilizer material; or at least 50 wt. % of stabilizer material.

In some embodiments, the fertilizer composition comprises: not greater than 5 wt. % of stabilizer material; not greater than 7 wt. % of stabilizer material; not greater than 10 wt. % of stabilizer material; not greater than 15 wt. % of stabilizer material; not greater than 20 wt. % of stabilizer material; not greater than 25 wt. % of stabilizer material; not greater than 30 wt. % of stabilizer material; not greater than 35 wt. % of stabilizer material; not greater than 40 wt. % of stabilizer material; not greater than 45 wt. % of stabilizer material; or not greater than 50 wt. % of stabilizer material.

As used herein, "explosive device" means: a device that provides for a sudden, loud, and violent release of energy that happens when the device (or material therein) breaks apart in such a way that sends parts flying outward. Non-limiting examples of explosive devices include bombs and/or improvised explosive devices.

As used herein, "booster" means: an auxiliary device for increasing force, power, pressure, or effectiveness. In some embodiments, booster refers to the portion of the blast propagation test that initializes the blast. In some embodiments, the booster in the blast propagation test includes C4 explosive.

As used herein, "detonation" means: the act or process of exploding of causing something to explode. In some embodiments, one or more stabilizer materials of the instant disclosure effect a reduction in or elimination of the detonation of ammonium nitrate material (e.g. utilized in an explosive device as an oxidizing material).

As used herein, "suppressant" means: an agent that tends to prevent, control, or reduce the intensity of a particular property of a material. In some embodiments, suppressant effects are quantified by measuring a reduction in specific impulse of a fertilizer composition, as compared to control (commercially available AN or AN fertilizer) or existing blast resistant fertilizers (e.g. CAN-27). In some embodiments, suppressant refers to a chemical mechanism of blast inhibition and/or prevention.

As used herein, "diluent" means: a diluting agent. In some embodiments, the stabilizer materials to the ammonium nitrate act as filler, thinning out the proximity of particles of ammonium nitrate from one another. In some embodiments, diluent refers to a mechanical mechanism of blast inhibition and/or prevention (i.e. dilution by addition of stabilizer material which acts as a filler material).

As used herein, "substantially non-reactive" means: dimensionally stable. In some embodiments, substantially non-reactive means inert (non-reacting). Some non-limiting examples of substantially non-reactive stabilizer materials include: sand, clay (i.e. naturally occurring and/or synthetic clays), aggregate (i.e. rocks), and the like.

As used herein, "byproduct of metal production" means: a compound or class of materials that is produced by one or more processes of making non-ferrous metal (e.g. aluminum). Some non-limiting processes include: the Bayer process, smelting, refining, casting, recycling, producing various products, product forms, and combinations thereof.

Some non-limiting examples of stabilizer materials that are products of aluminum production and/or processing include: apatite, electrostatic precipitator fines (ESP), Bayer process byproducts, and combinations thereof.

As used herein, "Bayer process byproduct" means: a substance produced during the reduction of bauxite to form/produce alumina. Non-limiting examples of stabilizer materials that are Bayer process byproducts include: layered double hydroxides, hydrotalcite, bauxite residue, neutralized bauxite residue, dawsonite, fukalite, aluminum hydroxide, smelter grade alumina (SGA), and combinations thereof.

As used herein, "layered double hydroxide" means: a class of compounds which are characterized by multiple (e.g. two) positively charged layers and weakly bound, often exchangeable central ion(s) (e.g. negatively charged ions) located in the interlayer (middle) region. As a non-limiting example, LDHs are commonly referred to by the following generic chemical formula:

$$[M^{2+}_{1-x}M^{3+}(OH)_2]^{q+}(X^{n-})_{q/n}\cdot yH_2O \qquad (eq.\ 1)$$

As some non-limiting examples, z=2, $M^{2+}$=Ca, $Mg^{2+}$, $Mn^{2+}$, $Fe^{2+}$, $Co^{2+}$, $Ni^{2+}$, $Cu^{2+}$, or $Zn^{2+}$, (hence q=x).

Non-limiting examples of LDH compounds include: hydrotalcites, hydrocalumite, hydromagnesite, takovite, woolite, and combinations thereof.

In some embodiments, "unavoidable minor components" means: various chemicals and minerals that are present in the stabilizer materials. Some non-limiting examples include: iron-containing compounds (e.g. $Fe_2O_3$; FeOOH; $Fe_3O_4$); silicon-containing compounds (e.g. $SiO_2$); titanium-containing compounds (e.g. $TiO_2$); sodium-containing compounds (e.g. NaOH; $NaNO_3$; $Na_3PO_4$; $Na_2HPO_4$; $Na_2CO_3$); calcium-containing compounds (e.g. CaO; $Ca(OH)_2$; $CaSO_4$; $CaCO_3$; $Ca_3(Al(OH)_4)_6$; TCA (tricalcium aluminate)); magnesium-containing compounds (e.g. MgO;

Mg(OH)$_2$; MgCO$_3$); anionic organic compounds (e.g. oxalate (sodium oxalate), formate (ammonia formate), acetate); aluminum-containing compounds (e.g. Al(OH)$_3$; AlOOH); and combinations thereof.

In some embodiments, the total weight percent of unavoidable minor components is not greater than 30 wt. % (i.e. for each compound). In some embodiments, the unavoidable minor component is: not greater than 30 wt. %; not greater than 25 wt. %; not greater than 20 wt. %; not greater than 15 wt. %; not greater than 10 wt. %; not greater than 7 wt. %; not greater than 5 wt. %; not greater than 3 wt. %; not greater than 1%; not greater than 0.5 wt. %; not greater than about 0.3 wt. %; or not greater than 0.1 wt. %.

In some embodiments, the unavoidable minor component is: not less than 30 wt. %; not less than 25 wt. %; not less than 20 wt. %; not less than 15 wt. %; not less than 10 wt. %; not less than 7 wt. %; not less than 5 wt. %; not less than 3 wt. %; not less than 1%; not less than 0.5 wt. %; or not less than about 0.1 wt. %.

In some embodiments, for bauxite residue the unavoidable minor component content are not greater than 30 wt. % for each component.

In some embodiments, for bauxite, the content of unavoidable minor components is not greater than 30 wt. % for each component.

In some embodiments, for HTC, the content of unavoidable minor components is not greater than 20 wt. % for each component.

In some embodiments, for apatite, the content of unavoidable minor components is not greater than 20 wt. % for each component.

In some embodiments, for smelting grade alumina, the content of unavoidable minor components is not greater than about 1 wt. %.

As used herein, "intercalated" means: a substances which has another substance or material inserted between or among existing elements or layers. In some embodiments, an LDH is intercalated with its central/interlayer region being replaced with other anions or compounds.

Non-limiting examples of intercalated LDH (sometimes called iLDH) include: herbicides, pesticides, anti-fungal agents, supplemental nutrients (e.g. phosphorous compounds, nitrogen compounds, sulfur compounds, trace-element compounds, and combinations thereof). In some embodiments, the LDH is intercalated with a nitrate. In some embodiments, the LDH is intercalated with a sulfate. In some embodiments, the LDH is intercalated with a phosphate.

In some embodiments, LDH comprises hydrotalcite (HTC). In some embodiments, LDH comprises hydrocalumite.

As used herein, "hydrotalcite" means: a layered double hydroxide of the following formula:

Mg$_6$Al$_2$(CO$_3$)(OH)$_{16}$*4(H$_2$O)　　(eq. 2)

Non-limiting examples of groups of materials within the hydrotalcites supergroup include: hydrotalcites group, quintinite group, fougerite group, woodwardite group, glaucerinite group, cualstibite group, hydrocalumite group, and unclassified.

Non-limiting examples of hydrotalcites include: pyroaurite, stichtite, meixnerite, iowaite, droninoite, woodallite, desaurelsite, takovite, reevesite, jamborite, quintinite, charmarite, caresite, zaccagnaite, chrlomagaluminite, fougerite, woodwardite, zincowoodwardite, honessite, claucocerinite, hydrowoodwardite, carrboydite, hydrohonessite, mountkeithite, sincaluminite, wermlandite, shigaite, nikischerite, motukoreaite, natroglaucocerinite, karchevskyite, cualstibite, xincalstibite, hydroclumite, kuzelite, coalingite, brugnatellite, muskoxite, and combinations thereof.

Non-limiting examples of intercalated hydrotalcites (sometimes called iHTC) include: HTC-carbonate, HTC-phosphate, HTC-nitrate, and combinations thereof.

As used herein, "apatite" means: a phosphate mineral having calcium phosphate with some fluorine, chlorine, and other elements. In some embodiments, apatite is neutralized with group of phosphate minerals. One example of an apatite compound is hydroxyapatite.

As used herein, "bauxite residue" means: particulate alkaline clay produced as a byproduct of the Bayer Process (e.g. the process of refining of bauxite ore into alumina). In some embodiments, bauxite residue (sometimes called red mud) includes a plurality of metals, metal oxides, clay, and zeolites. In some embodiments, the bauxite residue is generally free from draining liquids and is neutralized from its original form (i.e. slurry having volatile components at a pH of approximately 13).

In some embodiments, bauxite residue may be neutralized via acid or neutralized by the atmosphere (e.g. via reaction with ambient carbon dioxide and/or contact with anthropogenic carbon dioxide).

In some embodiments, the BR is neutralized with aluminum hydroxide, forming bauxite residue (NO$_3$). In some embodiments, the resulting BR compound has a nitrate content of 5-10 wt. %.

In some embodiments, the BR is neutralized with phosphoric acid, forming bauxite residue (PO$_4$). In some embodiments, the resulting BR compound has a phosphate content of 5-10 wt. %.

As used herein, "acid neutralized" means: a material which is made chemically neutral (or closer to neutral) through the addition of an acid. Non-limiting acids include: phosphoric acid, nitric acid, sulfuric acid, organic acids, minerals, and combinations thereof.

As used herein, "dawsonite" means: a sodium aluminate carbonate hydroxide compound. In some embodiments, dawsonite is a byproduct of the refining step(s) (e.g. after addition of sodium hydroxide in the Bayer Process).

As used herein, "fukalite" means: a calcium silicate carbonate compound. In some embodiments, fukalite is a hydroxide or a fluoride derivative of a calcium silicate carbonate compound. In some embodiments, fukalite is a byproduct of the refining step(s) (e.g. after addition of sodium hydroxide in the Bayer Process).

In some embodiments, dawsonite, fukalite, hydroxyapatite, and hydroxymagnesite are components in bauxite residue. In some embodiments, dawsonite, fukalite, hydroxyapatite, and hydroxymagnesite are components in bauxite.

As used herein, "ESP" means the dust that comes from an electrostatic precipitator (i.e. used to clean industrial process exhaust streams). In some embodiments, ESP comprises (e.g. as a major component) alumina fines which are removed from exhaust fumes of industrial processes.

As used herein, "bauxite" means: an ore from which alumina is extracted. In some embodiments, bauxite ore comprises: alumina, iron oxides, silicates, calcium carbonate, sodium hydroxide, calcium oxide, titania, manganese oxide, magnesium oxide, phosphates. In some embodiments, bauxite comprises at least 30 wt. % alumina; at least 40% alumina; at least 50% alumina; at least 60% alumina; at least 70 wt. %; at least 80 wt. %; at least 90 wt. %, or higher.

In some embodiments, phosphogypsum is used to neutralize bauxite residue.

As used herein, "hydromagnesite" means: a magnesium carbonate mineral.

As used herein, "dolomite" means an ore having magnesium carbonate and calcium carbonate therein.

As used herein, "red lime" means: a mixture of tricalcium aluminate (TCA) and calcium carbonate, with some iron oxides present, which is a byproduct of aluminum processing.

In some embodiments, TCA is the major component (i.e. at least 51 wt. %) in red lime. In some embodiments, TCA is: at least 50 wt. %: at least 55 wt. %; at least 60 wt. %; at least 65 wt. %; at least 70 wt. %; at least 75 wt. %; at least wt. 80%; at least 85 wt. %; at least 90 wt. %; at least 95 wt. %; or at least 99 wt. % (with the remainder being calcium carbonate and/or iron oxides).

In some embodiments, TCA is the major component (i.e. not greater than 51 wt. %). In some embodiments, TCA is: not greater than 50 wt. %: not greater than 55 wt. %; not greater than 60 wt. %; not greater than 65 wt. %; not greater than 70 wt. %; not greater than 75 wt. %; not greater than. 80 wt %; not greater than 85 wt. %; not greater than 90 wt. %; not greater than 95 wt. %; or not greater than 99 wt. % (with the remainder being calcium carbonate and/or iron oxides).

As used herein, "binder" means: a material that is used to hold things together. As some non-limiting examples, embodiments of binders include: waste from paper mills, sugars, polymers, starches, water, guar gum, clays (e.g. bentonite), sodium silicates, and combinations thereof.

In one embodiment, the fertilizer composition stabilizer material is: BR (acid neutralized, anthropogenically neutralized, or phosphogypsum neutralized); LDH (as-is or intercalated); HTC (as-is or intercalated); apatite; bauxite; phosphate compounds (e.g. potassium phosphate, calcium phosphate, sodium phosphate, diammonium phosphate), salts of organic acids (e.g. oxalate, formate, acetate), red lime, TCA, aluminum hydroxide (also called hydrate), SGA, ESP, and inert agents (e.g. sand, clay).

In one embodiment, when the fertilizer composition has 10 wt. % of stabilizer material and there are two stabilizer materials present (a first and a second), the content of first to second stabilizer materials are as follows: 2 wt. % of a first and 8 wt. % of a second or 5 wt. % of each of the first and the second.

In one embodiment, when the fertilizer composition has 15 wt. % of stabilizer material and there are two stabilizer materials present (a first and a second), the content of first to second stabilizer materials are as follows: 5 wt. % of a first and 10 wt. % of a second, 7.5 wt. % of each of the first and the second.

In one embodiment, when the fertilizer composition has 20 wt. % of stabilizer material and there are two stabilizer materials present (a first and a second), the content of first to second stabilizer materials are as follows: 5 wt. % of a first and 15 wt. % of a second, or 10 wt. % of each of the first and the second.

In one embodiment, when the fertilizer composition has 25 wt. % of stabilizer material and there are two stabilizer materials present (a first and a second), the content of first to second stabilizer materials are as follows: 5 wt. % of a first and 20 wt. % of a second, 10 wt. % of a first and 15 wt. % of a second; 12.5 wt % of each of the first and the second.

In one embodiment, when the fertilizer composition has 30 wt. % of stabilizer material and there are two stabilizer materials present (a first and a second), the content of first to second stabilizer materials are as follows: 5 wt. % of a first and 25 wt. % of a second, 10 wt. % of a first and 20 wt. % of a second; 15 wt. % of each of a first and second.

In one embodiment, the fertilizer composition stabilizer material is: BR; LDH; HTC; apatite; bauxite; phosphate compounds; salts of organic acids; red lime; TCA; aluminum hydroxide; SGA, ESP, and inert agents (e.g. sand, clay).

In one embodiment, the fertilizer composition stabilizer material is: BR and LDH. In one embodiment, the fertilizer composition stabilizer material is: BR and HTC. In one embodiment, the fertilizer composition stabilizer material is: BR and apatite. In one embodiment, the fertilizer composition stabilizer material is: BR and bauxite. In one embodiment, the fertilizer composition stabilizer material is: BR and phosphate compounds. In one embodiment, the fertilizer composition stabilizer material is: BR and salts of organic acids. In one embodiment, the fertilizer composition stabilizer material is: BR and red lime. In one embodiment, the fertilizer composition stabilizer material is: BR and TCA. In one embodiment, the fertilizer composition stabilizer material is: BR and aluminum hydroxide. In one embodiment, the fertilizer composition stabilizer material is: BR and SGA. In one embodiment, the fertilizer composition stabilizer material is: BR and ESP. In one embodiment, the fertilizer composition stabilizer material is: BR and inert agents (e.g. sand, clay).

In one embodiment, the fertilizer composition stabilizer material is: LDH (other than HTC) and HTC. In one embodiment, the fertilizer composition stabilizer material is: LDH and apatite. In one embodiment, the fertilizer composition stabilizer material is: LDH and phosphate compounds. In one embodiment, the fertilizer composition stabilizer material is: LDH and salts of organic acids. In one embodiment, the fertilizer composition stabilizer material is: LDH and red lime. In one embodiment, the fertilizer composition stabilizer material is: LDH and TCA. In one embodiment, the fertilizer composition stabilizer material is: LDH and aluminum hydroxide. In one embodiment, the fertilizer composition stabilizer material is: LDH and SGA. In one embodiment, the fertilizer composition stabilizer material is: LDH and ESP. In one embodiment, the fertilizer composition stabilizer material is: LDH and inert agents (e.g. sand, clay).

In one embodiment, the fertilizer composition stabilizer material is: HTC and apatite. In one embodiment, the fertilizer composition stabilizer material is: HTC and bauxite. In one embodiment, the fertilizer composition stabilizer material is: HTC and phosphate compound. In one embodiment, the fertilizer composition stabilizer material is: HTC and salts of organic acids. In one embodiment, the fertilizer composition stabilizer material is: HTC and red lime. In one embodiment, the fertilizer composition stabilizer material is: HTC and TCA. In one embodiment, the fertilizer composition stabilizer material is: HTC and aluminum hydroxide. In one embodiment, the fertilizer composition stabilizer material is: HTC and SGA. In one embodiment, the fertilizer composition stabilizer material is: HTC and ESP. In one embodiment, the fertilizer composition stabilizer material is: HTC and inert agents (e.g. sand, clay).

In one embodiment, the fertilizer composition stabilizer material is: apatite and bauxite. In one embodiment, the fertilizer composition stabilizer material is: apatite and phosphate compounds. In one embodiment, the fertilizer composition stabilizer material is: apatite and salts of organic acids. In one embodiment, the fertilizer composition stabilizer material is: apatite and red lime. In one embodiment, the fertilizer composition stabilizer material is: apatite and TCA. In one embodiment, the fertilizer composition stabilizer material is: apatite and aluminum hydroxide. In one embodiment, the fertilizer composition stabilizer material is: apatite and SGA. In one embodiment, the fertilizer composition stabilizer material is: apatite and ESP. In one embodiment, the fertilizer composition stabilizer material is: apatite and inert agents (e.g. sand, clay).

In one embodiment, the fertilizer composition stabilizer material is: bauxite and phosphate compounds. In one embodiment, the fertilizer composition stabilizer material is: bauxite and salts of organic acids. In one embodiment, the fertilizer composition stabilizer material is: bauxite and red lime. In one embodiment, the fertilizer composition stabilizer material is: bauxite and TCA. In one embodiment, the fertilizer composition stabilizer material is: bauxite and aluminum hydroxide. In one embodiment, the fertilizer composition stabilizer material is: bauxite and SGA. In one embodiment, the fertilizer composition stabilizer material is: bauxite and ESP. In one embodiment, the fertilizer composition stabilizer material is: bauxite and inert agents (e.g. sand, clay).

In one embodiment, the fertilizer composition stabilizer material is: phosphate compounds and salts of organic acids. In one embodiment, the fertilizer composition stabilizer material is: phosphate compounds and red lime. In one embodiment, the fertilizer composition stabilizer material is: phosphate compounds and TCA. In one embodiment, the fertilizer composition stabilizer material is: phosphate compounds and aluminum hydroxide. In one embodiment, the fertilizer composition stabilizer material is: phosphate compounds and SGA. In one embodiment, the fertilizer composition stabilizer material is: phosphate compounds and ESP. In one embodiment, the fertilizer composition stabilizer material is: phosphate compounds and inert agents (e.g. sand, clay).

In one embodiment, the fertilizer composition stabilizer material is: salts of organic acids and red lime. In one embodiment, the fertilizer composition stabilizer material is: salts of organic acids and TCA. In one embodiment, the fertilizer composition stabilizer material is: salts of organic acids and aluminum hydroxide. In one embodiment, the fertilizer composition stabilizer material is: salts of organic acids and SGA. In one embodiment, the fertilizer composition stabilizer material is: salts of organic acids and ESP. In one embodiment, the fertilizer composition stabilizer material is: salts of organic acids and inert agents (e.g. sand, clay).

In one embodiment, the fertilizer composition stabilizer material is: red lime and aluminum hydroxide. In one embodiment, the fertilizer composition stabilizer material is: red lime and SGA. In one embodiment, the fertilizer composition stabilizer material is: red lime and ESP. In one embodiment, the fertilizer composition stabilizer material is: red lime and inert agents (e.g. sand, clay).

In one embodiment, the fertilizer composition stabilizer material is: aluminum hydroxide and SGA. In one embodiment, the fertilizer composition stabilizer material is: aluminum hydroxide and ESP. In one embodiment, the fertilizer composition stabilizer material is: aluminum hydroxide and inert agents (e.g. sand, clay).

In one embodiment, the fertilizer composition stabilizer material is: SGA and, ESP. In one embodiment, the fertilizer composition stabilizer material is: SGA and inert agents (e.g. sand, clay).

In one embodiment, the fertilizer composition stabilizer material is: three of: BR; LDH; HTC; apatite; bauxite; phosphate compounds; salts of organic acids; red lime; TCA; aluminum hydroxide; SGA, ESP, and inert agents (e.g. sand, clay).

In some embodiments, the fertilizer composition stabilizer material is: BR; LDH; and HTC. In some embodiments, the fertilizer composition stabilizer material is: BR; LDH; and apatite. In some embodiments, the fertilizer composition stabilizer material is: BR; LDH; and bauxite. In some embodiments, the fertilizer composition stabilizer material is: BR; LDH; and phosphate compounds. In some embodiments, the fertilizer composition stabilizer material is: BR; LDH; and salts of organic acids. In some embodiments, the fertilizer composition stabilizer material is: BR; LDH; and red lime. In some embodiments, the fertilizer composition stabilizer material is: BR; LDH; and TCA. In some embodiments, the fertilizer composition stabilizer material is: BR; LDH; and aluminum hydroxide. In some embodiments, the fertilizer composition stabilizer material is: BR; LDH; and SGA. In some embodiments, the fertilizer composition stabilizer material is: BR; LDH; and ESP. In some embodiments, the fertilizer composition stabilizer material is: BR; LDH; and inert agents (e.g. sand, clay).

In one embodiment, the fertilizer composition stabilizer material is: LDH; apatite; and bauxite. In one embodiment, the fertilizer composition stabilizer material is: LDH; apatite; and phosphate compounds. In one embodiment, the fertilizer composition stabilizer material is: LDH; apatite; and salts of organic acids. In one embodiment, the fertilizer composition stabilizer material is: LDH; apatite; and red lime. In one embodiment, the fertilizer composition stabilizer material is: LDH; apatite; and TCA. In one embodiment, the fertilizer composition stabilizer material is: LDH; apatite; and aluminum hydroxide. In one embodiment, the fertilizer composition stabilizer material is: LDH; apatite; and SGA. In one embodiment, the fertilizer composition stabilizer material is: LDH; apatite; and ESP. In one embodiment, the fertilizer composition stabilizer material is: LDH; apatite; and inert agents (e.g. sand, clay).

In one embodiment, the fertilizer composition stabilizer material is: apatite; bauxite; and phosphate compounds. In one embodiment, the fertilizer composition stabilizer material is: apatite; bauxite; and salts of organic acids. In one embodiment, the fertilizer composition stabilizer material is: apatite; bauxite; and red lime. In one embodiment, the fertilizer composition stabilizer material is: apatite; bauxite; and TCA. In one embodiment, the fertilizer composition stabilizer material is: apatite; bauxite; and aluminum hydroxide. In one embodiment, the fertilizer composition stabilizer material is: apatite; bauxite; and SGA. In one embodiment, the fertilizer composition stabilizer material is: apatite; bauxite; and ESP. In one embodiment, the fertilizer composition stabilizer material is: apatite; bauxite; and inert agents (e.g. sand, clay).

In one embodiment, the fertilizer composition stabilizer material is: bauxite; phosphate compounds; and salts of organic acids. In one embodiment, the fertilizer composition stabilizer material is: bauxite; phosphate compounds; and red lime. In one embodiment, the fertilizer composition stabilizer material is: bauxite; phosphate compounds; and TCA. In one embodiment, the fertilizer composition stabilizer material is: bauxite; phosphate compounds; and aluminum hydroxide. In one embodiment, the fertilizer composition stabilizer material is: bauxite; phosphate compounds; and SGA. In one embodiment, the fertilizer composition stabilizer material is: bauxite; phosphate compounds; and ESP. In one embodiment, the fertilizer composition stabilizer material is: bauxite; phosphate compounds; and inert agents (e.g. sand, clay).

In one embodiment, the fertilizer composition stabilizer material is: phosphate compounds; salts of organic acids; and red lime. In one embodiment, the fertilizer composition stabilizer material is: phosphate compounds; salts of organic acids; and TCA. In one embodiment, the fertilizer composition stabilizer material is: phosphate compounds; salts of organic acids; and aluminum hydroxide. In one embodiment, the fertilizer composition stabilizer material is: phosphate compounds; salts of organic acids; and SGA. In one embodiment, the fertilizer composition stabilizer material is: phosphate compounds; salts of organic acids; and ESP. In one embodiment, the fertilizer composition stabilizer material is: phosphate compounds; salts of organic acids; and inert agents (e.g. sand, clay).

In one embodiment, the fertilizer composition stabilizer material is: salts of organic acids; red lime; and TCA. In one embodiment, the fertilizer composition stabilizer material is: salts of organic acids; red lime; and aluminum hydroxide. In one embodiment, the fertilizer composition stabilizer material is: salts of organic acids; red lime; and SGA. In one embodiment, the fertilizer composition stabilizer material is: salts of organic acids; red lime; and ESP. In one embodiment, the fertilizer composition stabilizer material is: salts of organic acids; red lime; and inert agents (e.g. sand, clay).

In one embodiment, the fertilizer composition stabilizer material is: red lime; TCA; and aluminum hydroxide. In one embodiment, the fertilizer composition stabilizer material is: red lime; TCA; and SGA. In one embodiment, the fertilizer composition stabilizer material is: red lime; TCA; and ESP. In one embodiment, the fertilizer composition stabilizer material is: red lime; TCA; and inert agents (e.g. sand, clay).

In one embodiment, the fertilizer composition stabilizer material is: TCA; aluminum hydroxide; and SGA. In one embodiment, the fertilizer composition stabilizer material is: TCA; aluminum hydroxide; and ESP. In one embodiment, the fertilizer composition stabilizer material is: TCA; aluminum hydroxide; and inert agents (e.g. sand, clay).

In one embodiment, the fertilizer composition stabilizer material is: aluminum hydroxide; SGA, and ESP. In one embodiment, the fertilizer composition stabilizer material is: aluminum hydroxide; SGA, and inert agents (e.g. sand, clay).

In one embodiment, the fertilizer composition stabilizer material is: SGA, ESP, and inert agents (e.g. sand, clay). In one embodiment, the fertilizer composition stabilizer material is: BR; apatite; and TCA. In one embodiment, the fertilizer composition stabilizer material is: apatite; bauxite; and TCA. In one embodiment, the fertilizer composition stabilizer material is: BR; bauxite, and TCA.

In one embodiment, the fertilizer composition stabilizer material is four of: BR; LDH; HTC; apatite; bauxite; phosphate compounds; salts of organic acids; red lime; TCA; aluminum hydroxide; SGA, ESP, and inert agents (e.g. sand, clay).

In one embodiment, the fertilizer composition stabilizer material is five of: BR; LDH; HTC; apatite; bauxite; phosphate compounds; salts of organic acids; red lime; TCA; aluminum hydroxide; SGA, ESP, and inert agents (e.g. sand, clay).

In one embodiment, the fertilizer composition stabilizer material is six of: BR; LDH; HTC; apatite; bauxite; phosphate compounds; salts of organic acids; red lime; TCA; aluminum hydroxide; SGA, ESP, and inert agents (e.g. sand, clay).

In one embodiment, the fertilizer composition stabilizer material is seven of: BR; LDH; HTC; apatite; bauxite; phosphate compounds; salts of organic acids; red lime; TCA; aluminum hydroxide; SGA, ESP, and inert agents (e.g. sand, clay).

In one embodiment, the fertilizer composition stabilizer material is eight of: BR; LDH; HTC; apatite; bauxite; phosphate compounds; salts of organic acids; red lime; TCA; aluminum hydroxide; SGA, ESP, and inert agents (e.g. sand, clay).

In one embodiment, the fertilizer composition stabilizer material is nine of: BR; LDH; HTC; apatite; bauxite; phosphate compounds; salts of organic acids; red lime; TCA; aluminum hydroxide; SGA, ESP, and inert agents (e.g. sand, clay).

In one embodiment, the fertilizer composition stabilizer material is ten of: BR; LDH; HTC; apatite; bauxite; phosphate compounds; salts of organic acids; red lime; TCA; aluminum hydroxide; SGA, ESP, and inert agents (e.g. sand, clay).

In one embodiment, the fertilizer composition stabilizer material is eleven of: BR; LDH; HTC; apatite; bauxite; phosphate compounds; salts of organic acids; red lime; TCA; aluminum hydroxide; SGA, ESP, and inert agents (e.g. sand, clay).

In one embodiment, the fertilizer composition stabilizer material is twelve of: BR; LDH; HTC; apatite; bauxite; phosphate compounds; salts of organic acids; red lime; TCA; aluminum hydroxide; SGA, ESP, and inert agents (e.g. sand, clay).

In one embodiment, the fertilizer composition stabilizer material is: BR; LDH; HTC; apatite; bauxite; phosphate compounds; salts of organic acids; red lime; TCA; aluminum hydroxide; SGA, ESP, and inert agents (e.g. sand, clay).

Without being bound by a particular mechanism or theory, it is believed that in one potential pathway, certain stabilizer materials may act as suppressants, causing a chemical inhibition of ammonium nitrate, thus preventing it from being utilized as an oxidizing material in an explosive device.

Without being bound by a particular mechanism or theory, it is believed that in another potential pathway, certain stabilizer materials may act as diluents, causing a mechanical inhibition of ammonium nitrate, thus preventing it from being utilized as an oxidizing material in an explosive device.

Without being bound by a particular mechanism or theory, it is believed that in yet another pathway, certain stabilizer materials may act as carbonating agents, such that carbon dioxide produced by the stabilizer material replaces/excludes oxygen needed for an explosion to continue/propagate, thus resulting in no increase in energy (needed to propagate the explosion).

Without being bound by a particular mechanism or theory, it is believed that in yet another pathway, certain stabilizer materials may act as hydrates, such that during an explosion event (increase in energy) the stabilizer material produces water vapor, which also acts to exclude oxygen or quench heat coming from the reaction so that resulting exothermic energy is reduced (and the material does not explode), thermal moderators.

Without being bound by a particular mechanism or theory, it is believed that in yet another pathway, certain stabilizer materials may act in accordance with an acid/base mechanism, such that the stabilizer material is basic or releases a base when at reaction conditions thus preventing ammonium nitrate from proceeding to nitric acid (thus the reaction will not proceed or take place). In some embodiments, the stabilizer material(s) act as a thermal moderator to adsorb energy, thus reducing the explosive force. In some embodiments, the stabilizer materials act as oxygen displacers by pushing out oxygen and replace the gas with a non-combustible (e.g. $CO_2$).

Without being bound by a particular mechanism or theory, the addition of bauxite, bauxite residue, the products and/or by-products of to ammonium nitrate fertilizer can provide a retardant for its potential misuse as an ingredient in homemade explosives.

Without being bound by a particular mechanism or theory, in some embodiments a stabilizer material is added to the fertilizer, where the chemical species in the stabilizer material acts to absorb some of the energy released if the fertilizer is used in ammonium nitrate fuel oil (ANFO) improvised explosive devices or other ammonium nitrate fuel combinations used for explosives. Specifically, in this potential mechanistic pathway, the chemical stabilizer materials are believed to absorb a portion of the heat released during ammonium nitrate-fuel detonations such that the stabilizer materials reduce the final equilibrium temperature of the system via both sensible heat absorption and endothermic chemical reactions. Along with the energy absorption property, the presence of stabilizer material solid particles is believed to reduce the energy density of the mixture via dilution of the filler material.

In some embodiments, the fertilizer composition includes a pH adjusting components. Non-limiting examples of pH adjusting components include: nitric acid, phosphoric acid, bauxite residue.

In some embodiments, the fertilizer composition includes a plant nutrient. Non-limiting examples of plant nutrients include: N, P, K, Mg, Ca, K, trace elements (Fe, Mn, metals present in the stabilizer material compounds), and combinations thereof.

These and other aspects, advantages, and novel features of the technology are set forth in part in the description that follows and will become apparent to those skilled in the art upon examination of the following descriptions and Figures, or is learned by practicing the embodiments of the instant disclosure.

BRIEF DESCRIPTION OF THE DRAWINGS

Referring to FIG. 4, blast tests were completed and specific impulse values were calculated for multiple test articles including: two test articles with commercially available AN fertilizer from vendor 1 (Control 1); three test articles with commercially available AN fertilizer from vendor 2 (Control 2); one test article with a commercially available "blast resistant" AN fertilizer (in ground form); two test articles of AN fertilizer from vendor 1 blended with bauxite residue (having 15 wt. % nitrate, present via addition of aluminum hydroxide and anthropogenic exposure to atmospheric carbon dioxide), and two test articles of AN fertilizer from vendor 2 blended with 25 weight percent of bauxite residue (having 15 wt. % phosphate).

Figure 4:
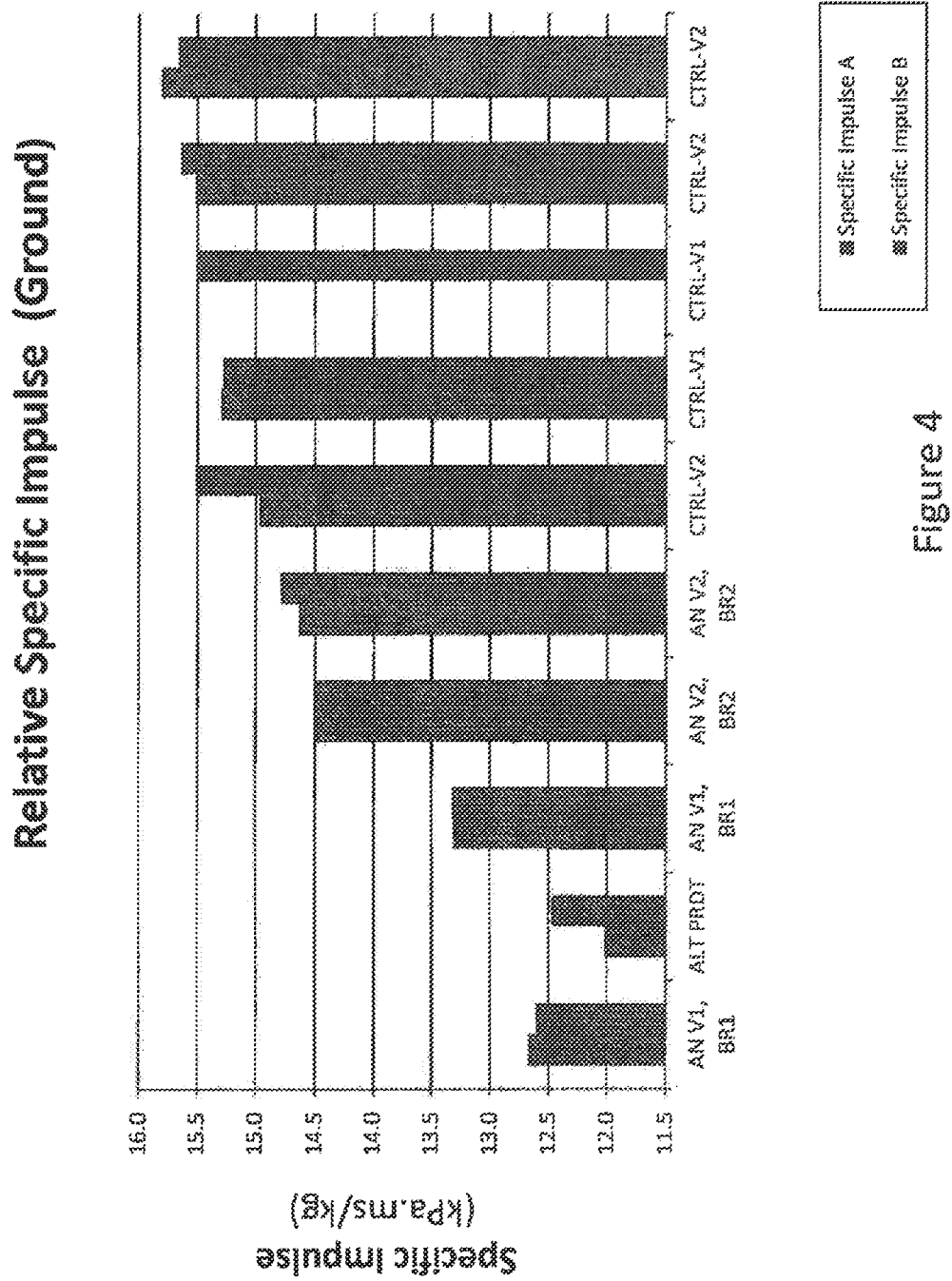
FIG. 4 is a chart depicting the relative Specific Impulse of ground fertilizer compositions, with the specific impulse from each overpressure sensor (two sensors for each blast test). Fertilizer compositions were prepared in accordance with the Examples. Blast tests were conducted in accordance with Examples.

As depicted in FIG. 4, the fertilizer compositions of BR and ammonium nitrate outperformed the commercially available AN. The commercially available "blast resistant" BR coated prills performed slightly better than ammonium nitrate from vendor 1 blended with bauxite residue having nitrate therein. Mean specific impulse values are provided in the table in the corresponding Examples section. Based on the results from this set of experiments, further blast testing was completed using only ground materials in the test articles, since any reduction in specific impulse realized in the ground form would translate to the prilled or pelletized form.

Figure 5:
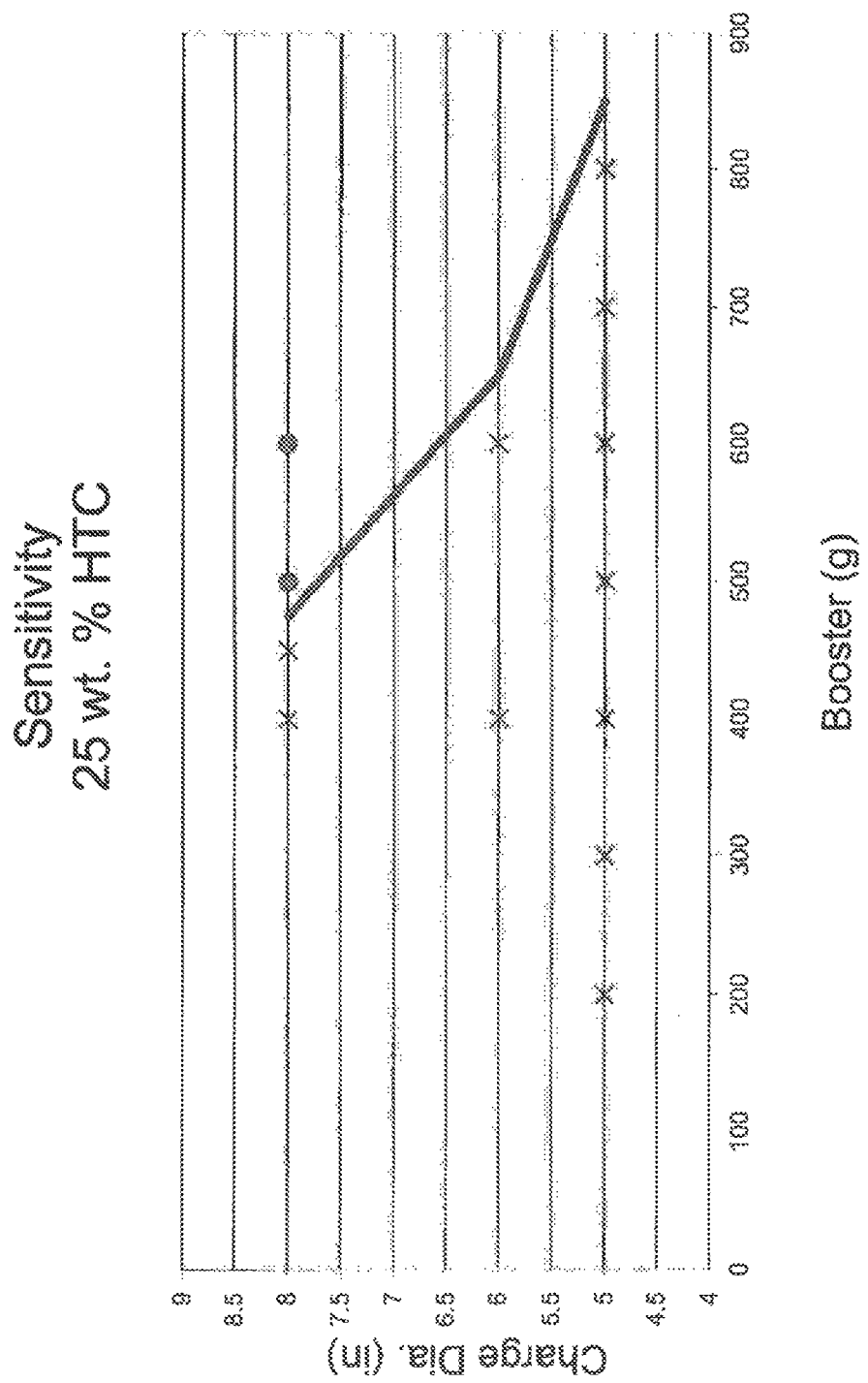

FIG. 5 is a chart depicting booster size (in grams) as a function of charge diameter (in inches) for a fertilizer composition of 25 wt. % hydrotalcites where solid circles indicate detonation while an "x" indicates no detonation. The plotted line depicts detonation versus non detonation region at a sensitivity of +50 g increase in booster size.

Figure 6:
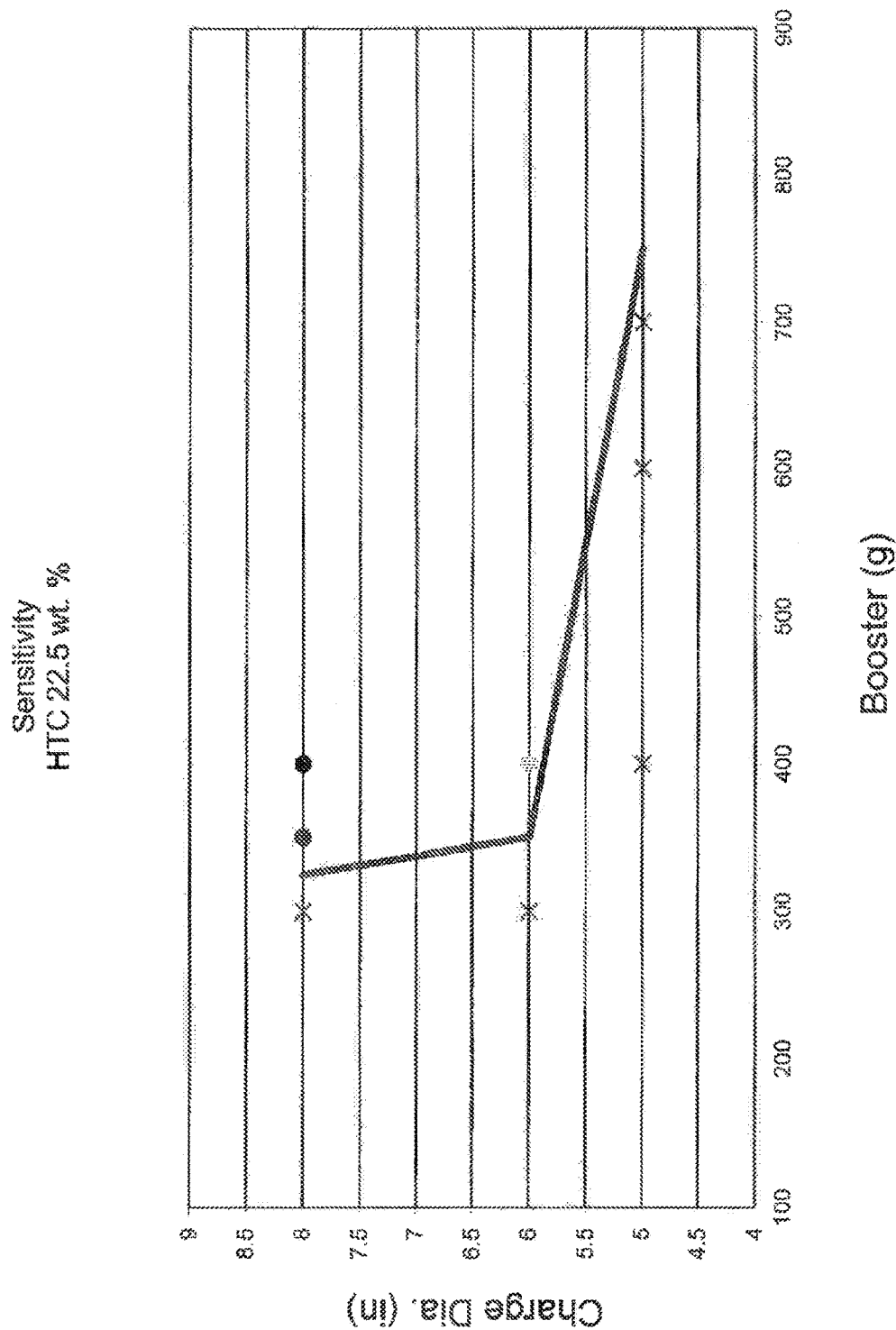

FIG. 6 is a chart depicting booster size (in grams) as a function of charge diameter (in inches) for a fertilizer composition of 22.5 wt. % hydrotalcites where solid circles indicate detonation while an "x" indicates no detonation. The plotted line depicts detonation versus non detonation region at a sensitivity of +50 g increase in booster size.

Figure 7:
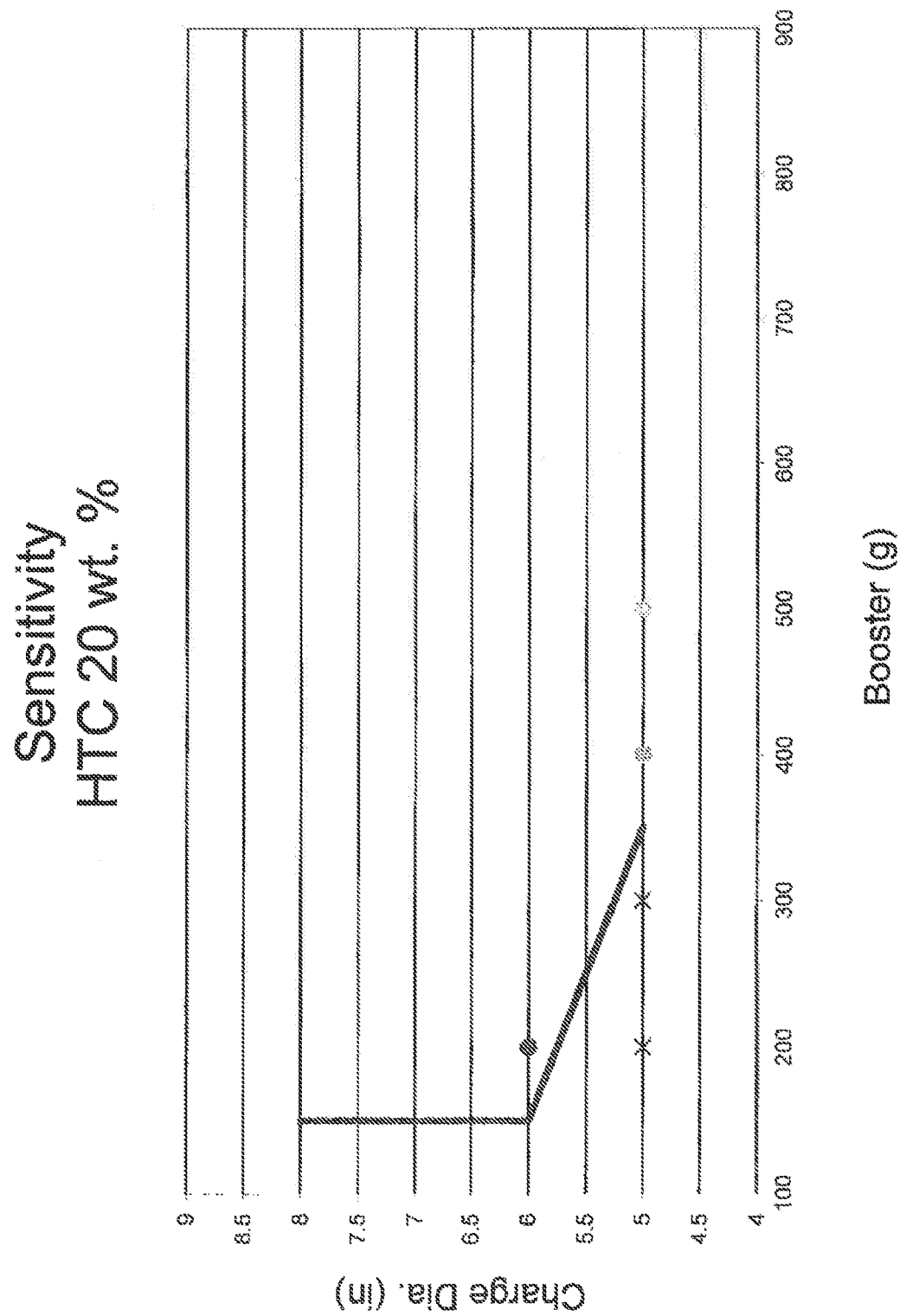

FIG. 7 is a graph is a chart depicting booster size (in grams) as a function of charge diameter (in inches) for a fertilizer composition of 20 wt. % hydrotalcites where solid circles indicate detonation while an "x" indicates no detonation. The plotted line depicts detonation versus non detonation region at a sensitivity of +50 g increase in booster size.

Figure 8:
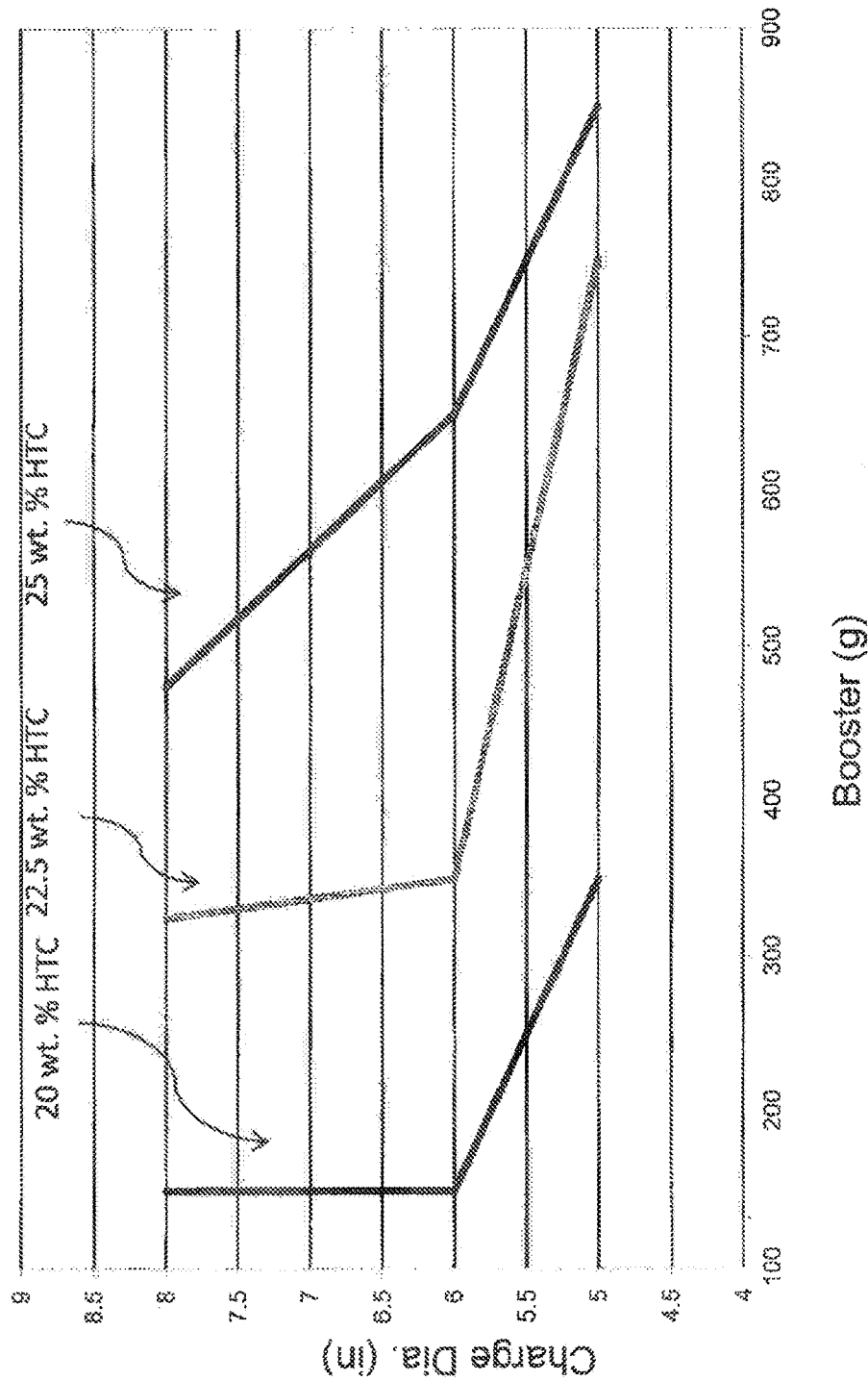

FIG. 8 is a graph is a chart depicting booster size (in grams) as a function of charge diameter (in inches) for a fertilizer composition of 20; 22.5 and 25 wt. % HTC-PO4. The plotted line depicts detonation versus non detonation region at a sensitivity of +50 g increase in booster size.

Figure 9:
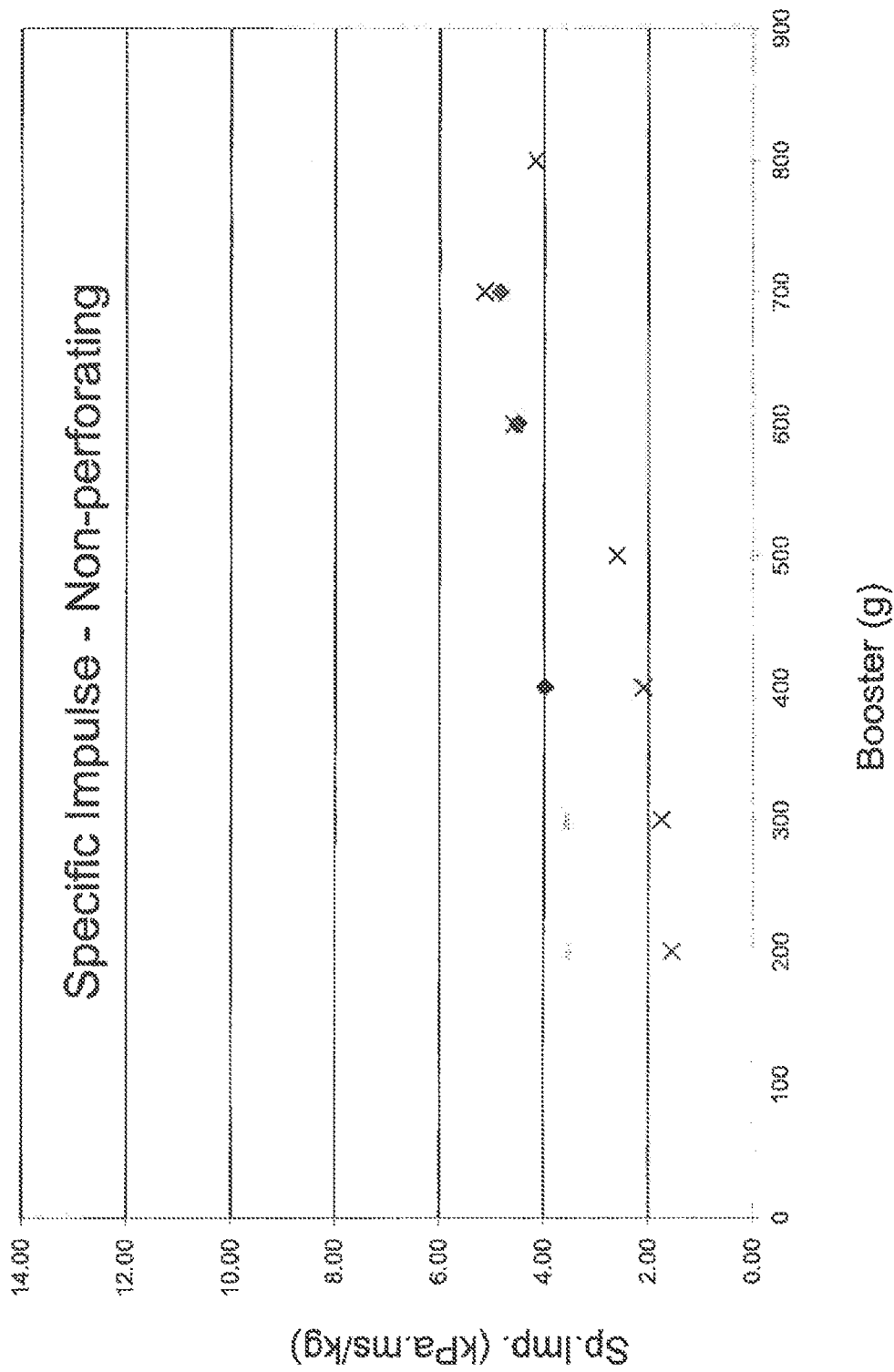

FIG. 9 is a graph depicting the specific impulse for test articles that resulted in a non-perforation of the witness plate, where "x" refers to 25 wt. % HTC, diamond depicts 22.5 wt. % and dashes depict 20 wt. %.

Figure 10:
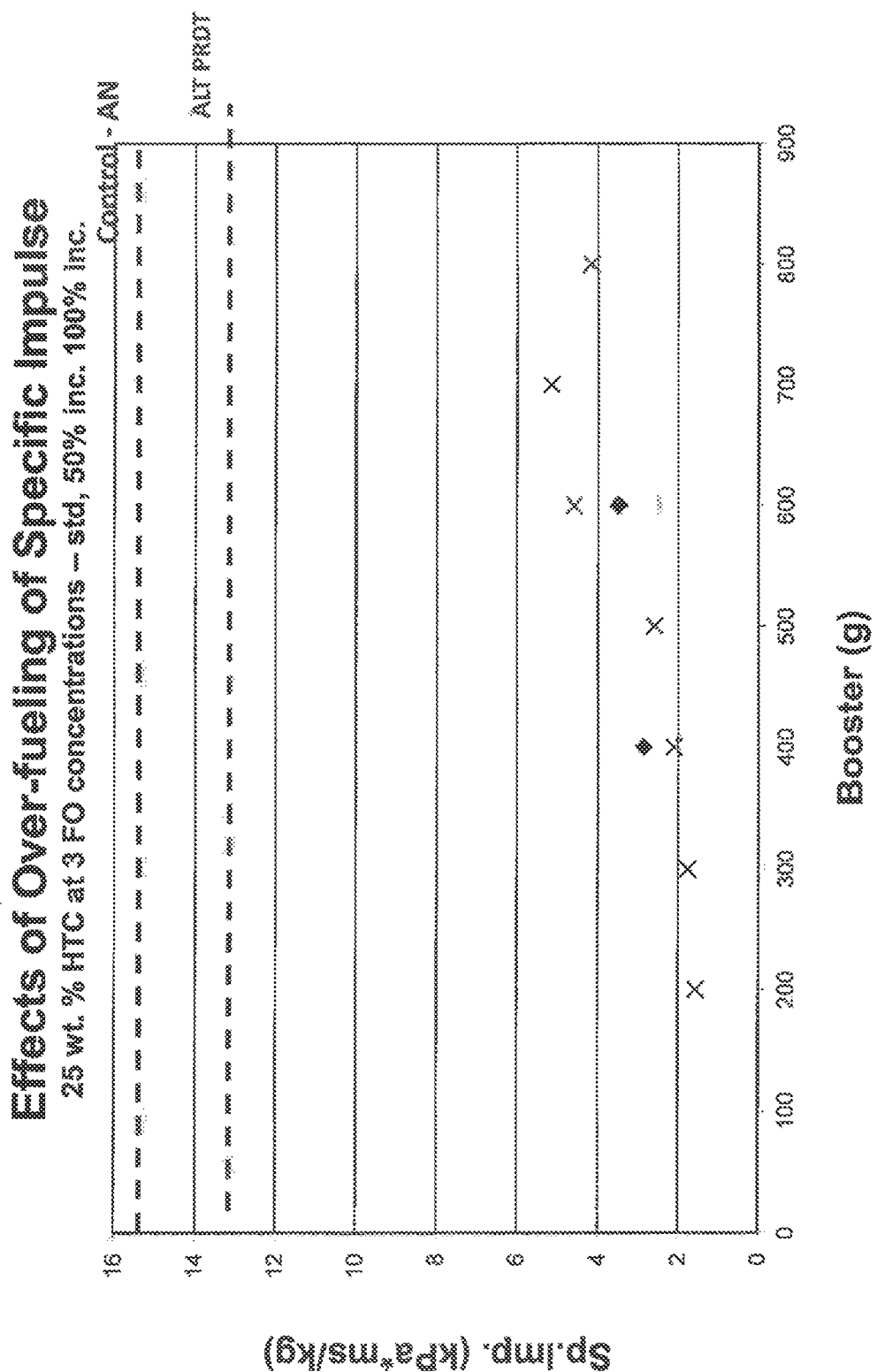

FIG. 10 is a graph depicting specific impulse at different booster sizes, where "x" refers to the standard fuel oil content (i.e. 6%, as compared to AN content); diamond refers to 50% more stoichiometric fuel oil (i.e. 9% as compared to the AN content); and where dash refers to 100% fuel oil (i.e. 12 wt. % as compared to AN content).

Figure 11:
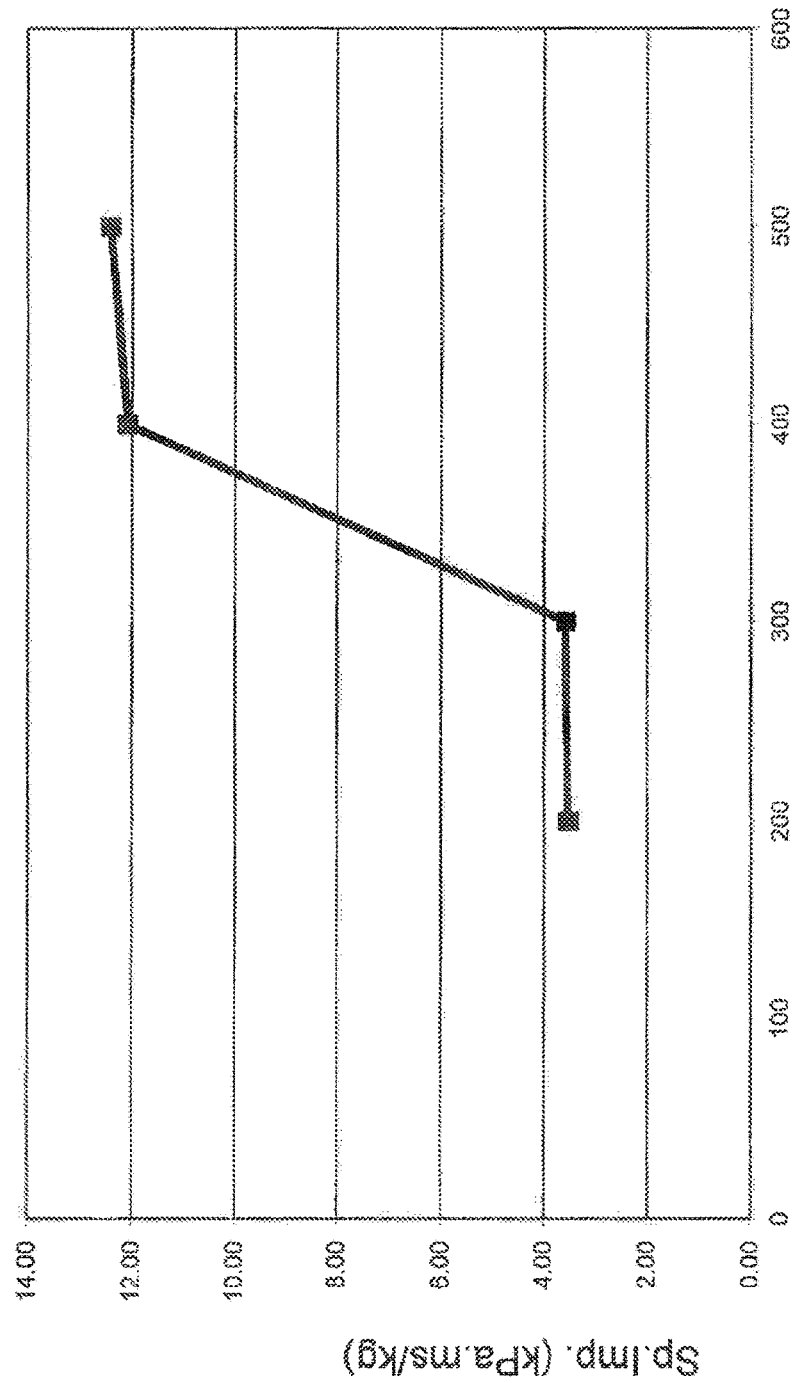

FIG. 11 is a graph depicting the specific impulse at different booster sizes for 20 wt. % HTC in a 5" diameter tube (test article).

Figure 12:
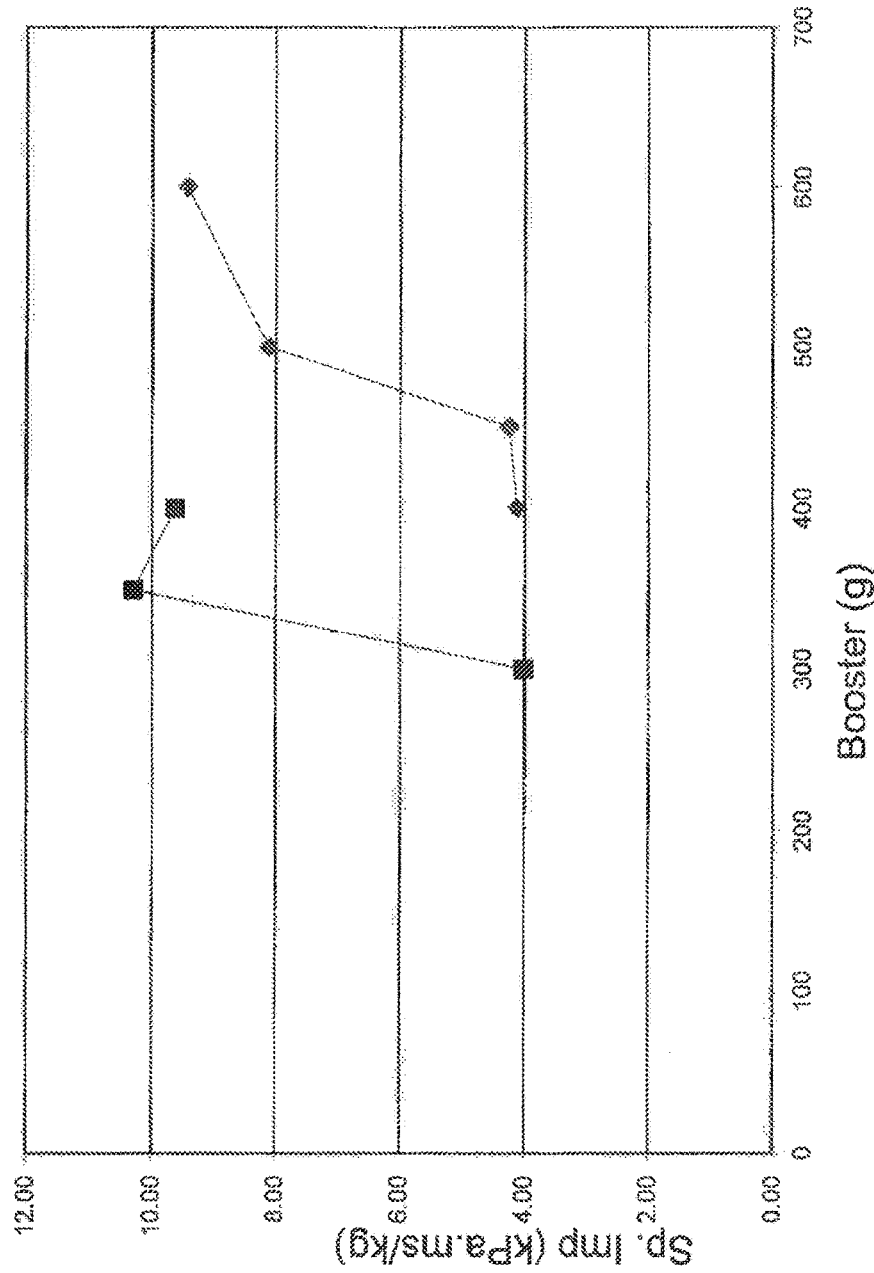

FIG. 12 is a graph that illustrates the specific impulse of HTC at 22.5% (square) and 25% (diamonds) concentration at an 8" diameter with booster size ranging from 300-600 g.

Figure 13:
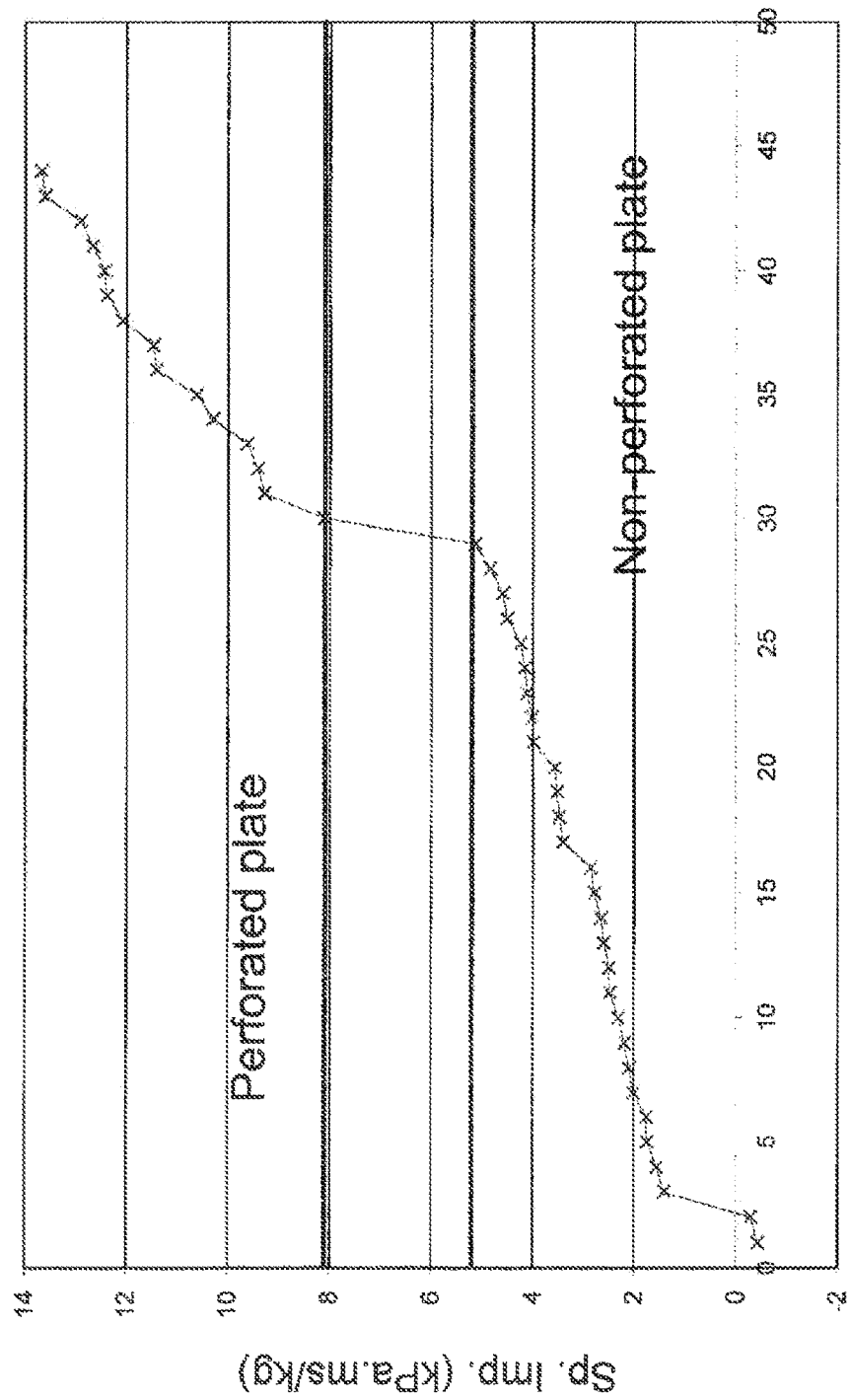

FIG. 13 is a graph that depicts the global cliff of all the stabilizer materials. The graph is plotted as number of sample against specific impulse. This data represents all data analyzed in the Blast Suppression and Desensitization Example and shows the distinction between non perforation and perforation. The data consists of HTC-$PO_4$, Apatite and HTC $PO_4$-15%/BR 10% mixture.

Figure 14:
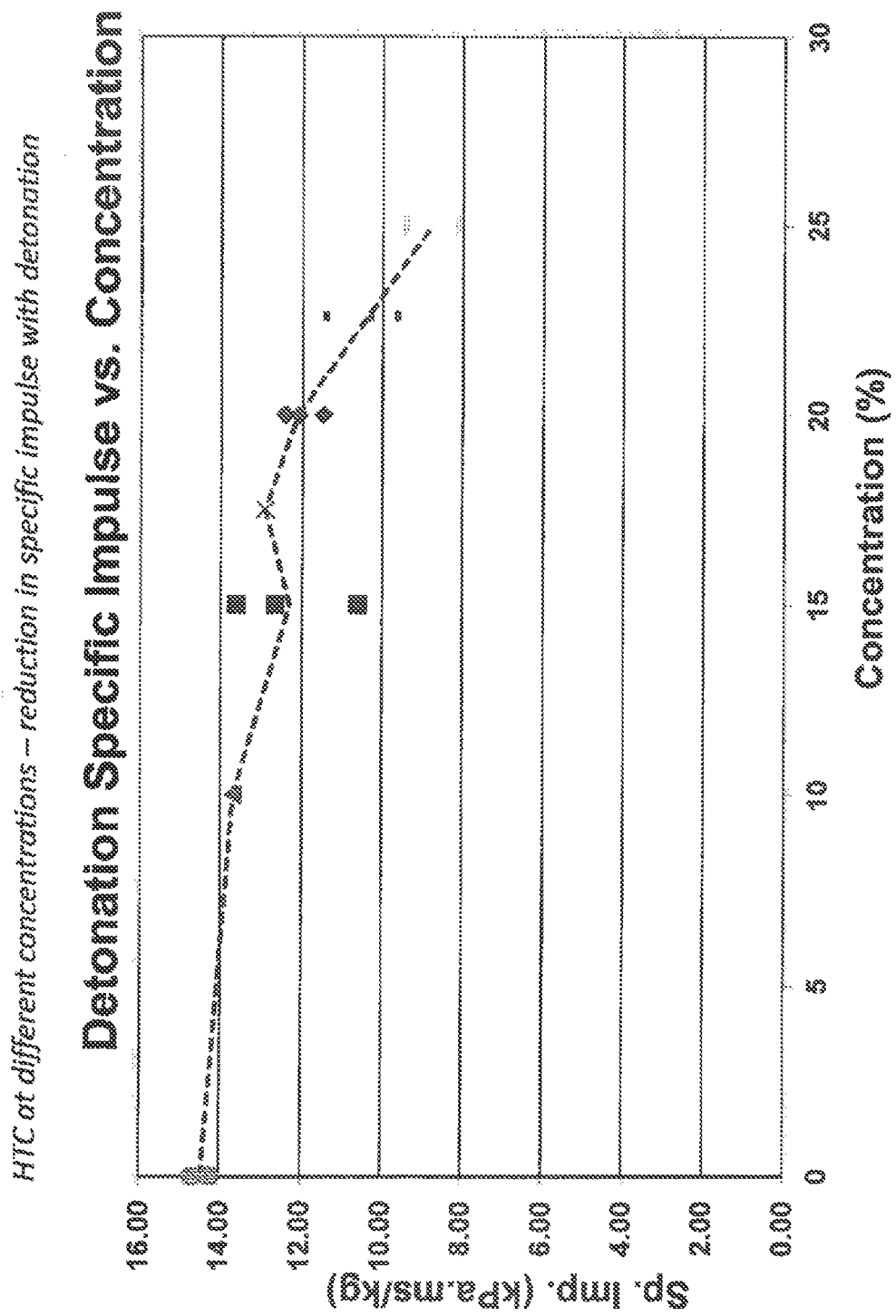

FIG. 14 is a graph that depicts the trends of specific impulse reduction in relation to concentration in percent. Listed in the graph are HTC-$PO_4$—22.5% (diamond), HTC-$PO_4$—20% (X), HTC-$PO_4$—15% (square), HTC-$PO_4$—10% (triangle) and AN (circle)

Figure 15:
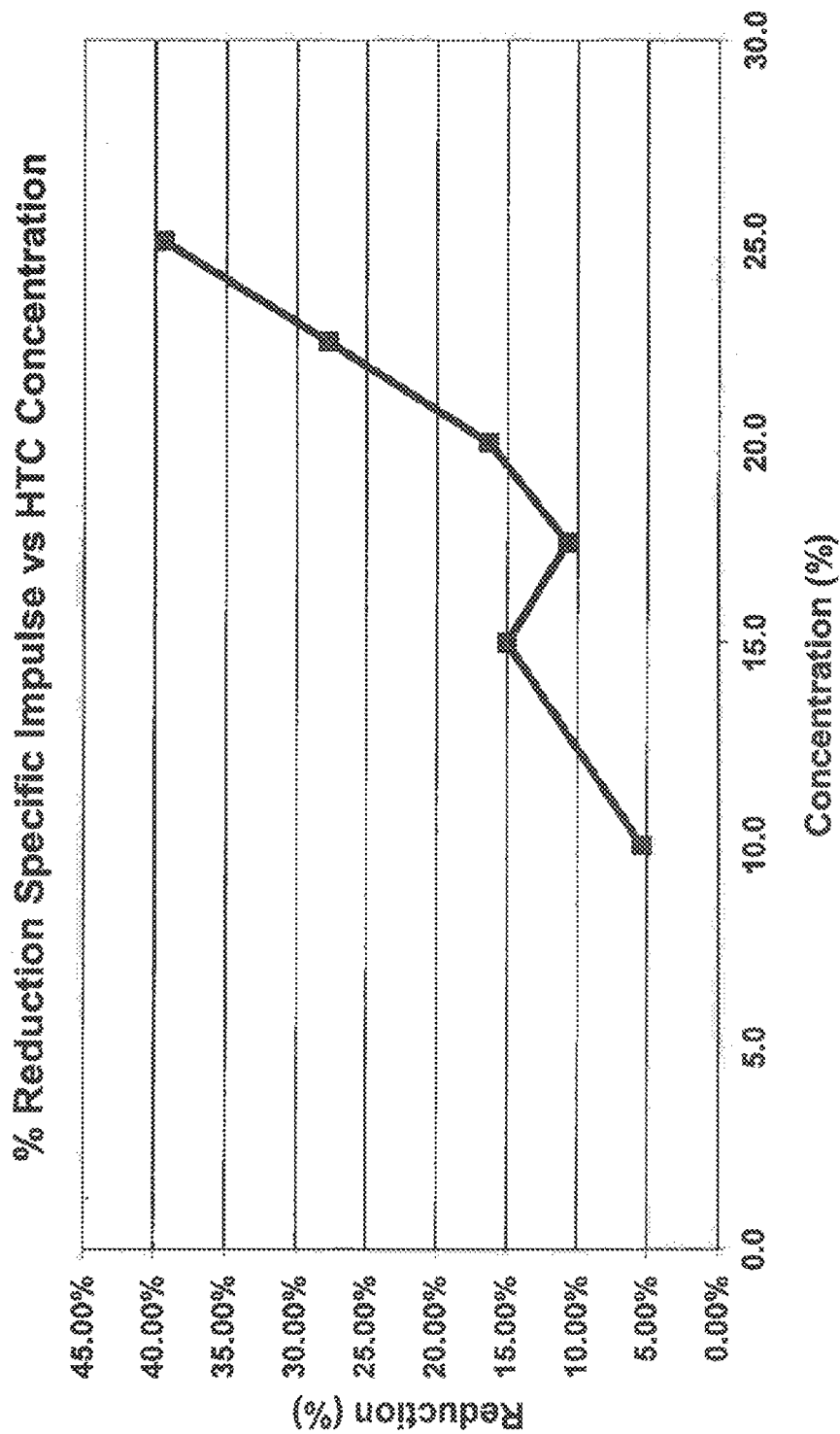

FIG. 15 is a graph that illustrates the percent reduction of specific impulse when compared to concentration of 10, 15, 17.5, 20, 22.5 and 25%.

Figure 16:
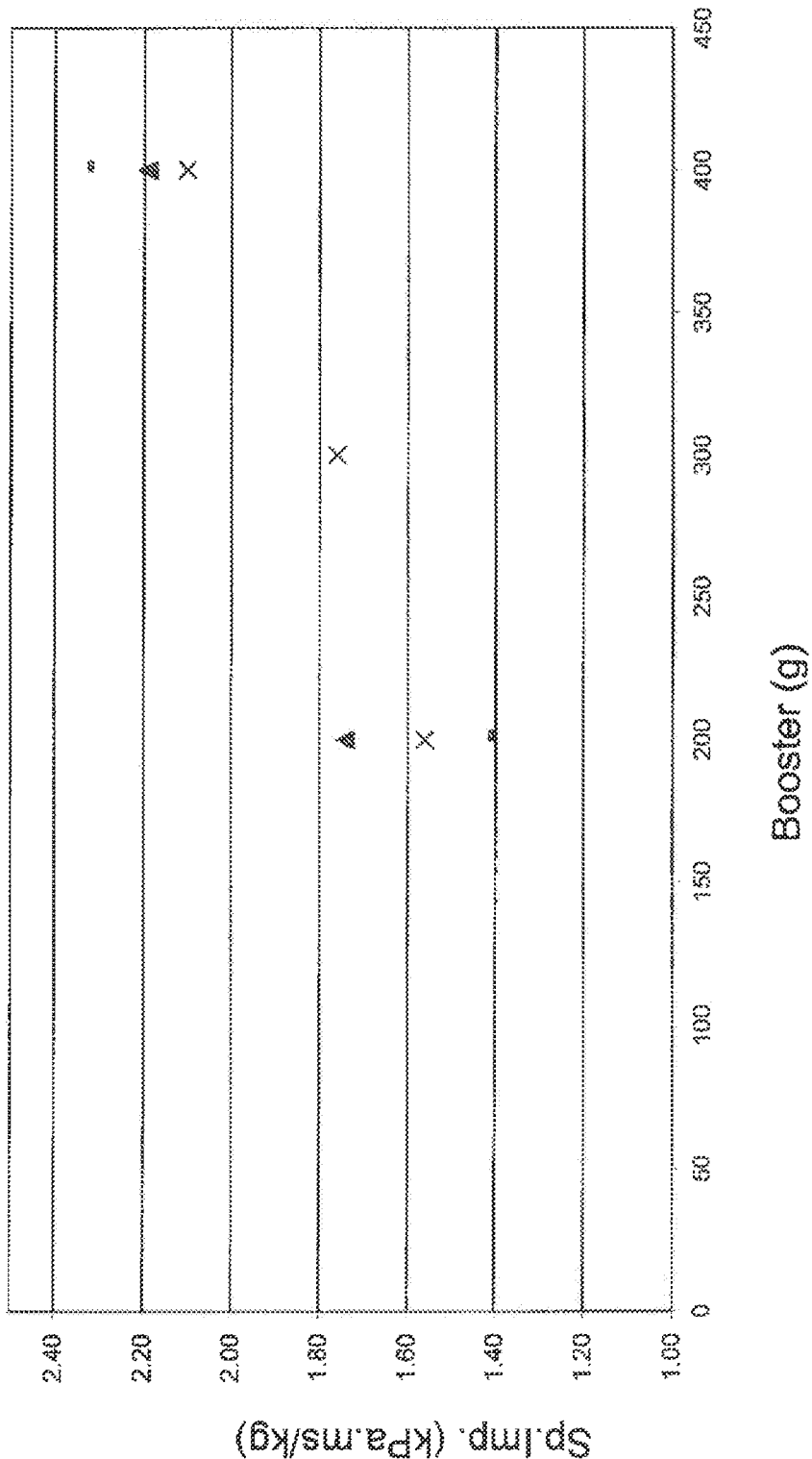

FIG. 16 is a graph depicts the specific impulse of stabilizer materials that showed non perforation at different booster levels at different concentration. X=HTC-$PO_4$—25%; Triangle=Apatite; Dash—HTC-$PO_4$—15%/BR 10%.

Figure 17:
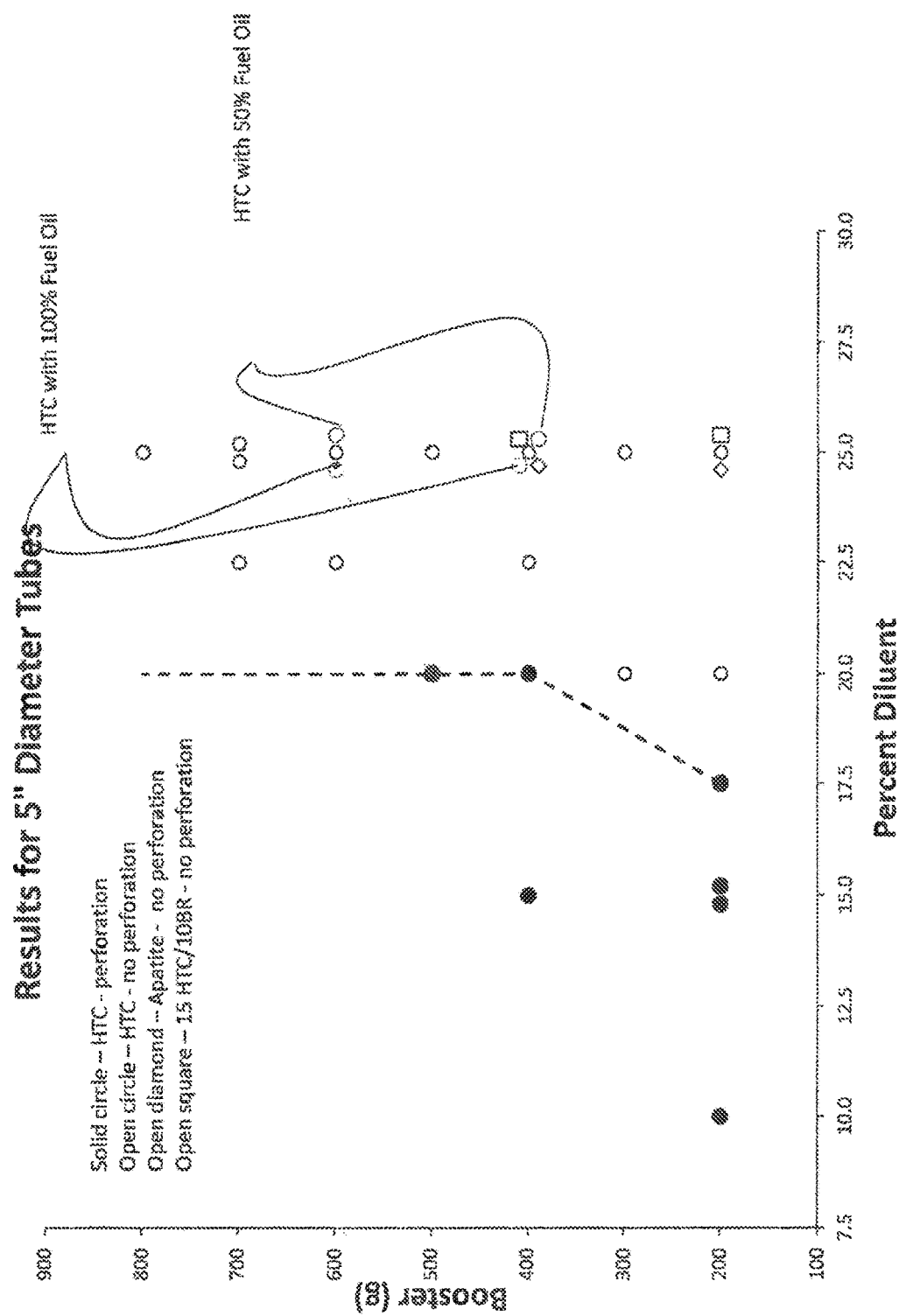

FIG. 17 is a graph that depicts perforating versus non-perforating of stabilizer materials at different booster charge and percent stabilizer material at 5" diameter with a 100% accuracy. Solids symbols indicate perforation; open symbols depicts non perforation. Circle=HTC $PO_4$—25%; Diamond=Apatite—25%; Square=HTC $PO_4$—15%/BR 10%

Figure 18:
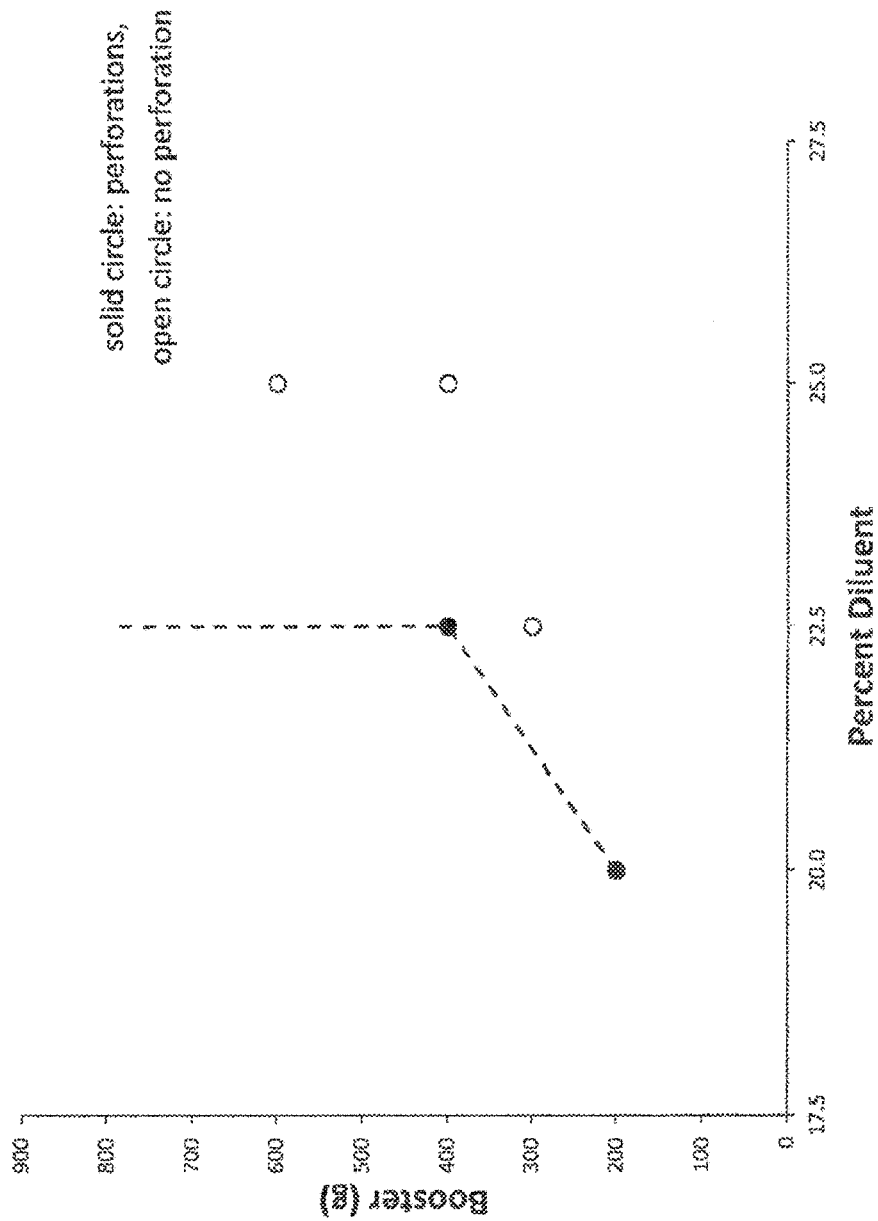

FIG. 18 is a graph that depicts perforating versus non-perforating of stabilizer materials at different booster charge and percent stabilizer material at 6" diameter. Solids symbols indicate perforation; open symbols depicts non perforation.

Figure 19:
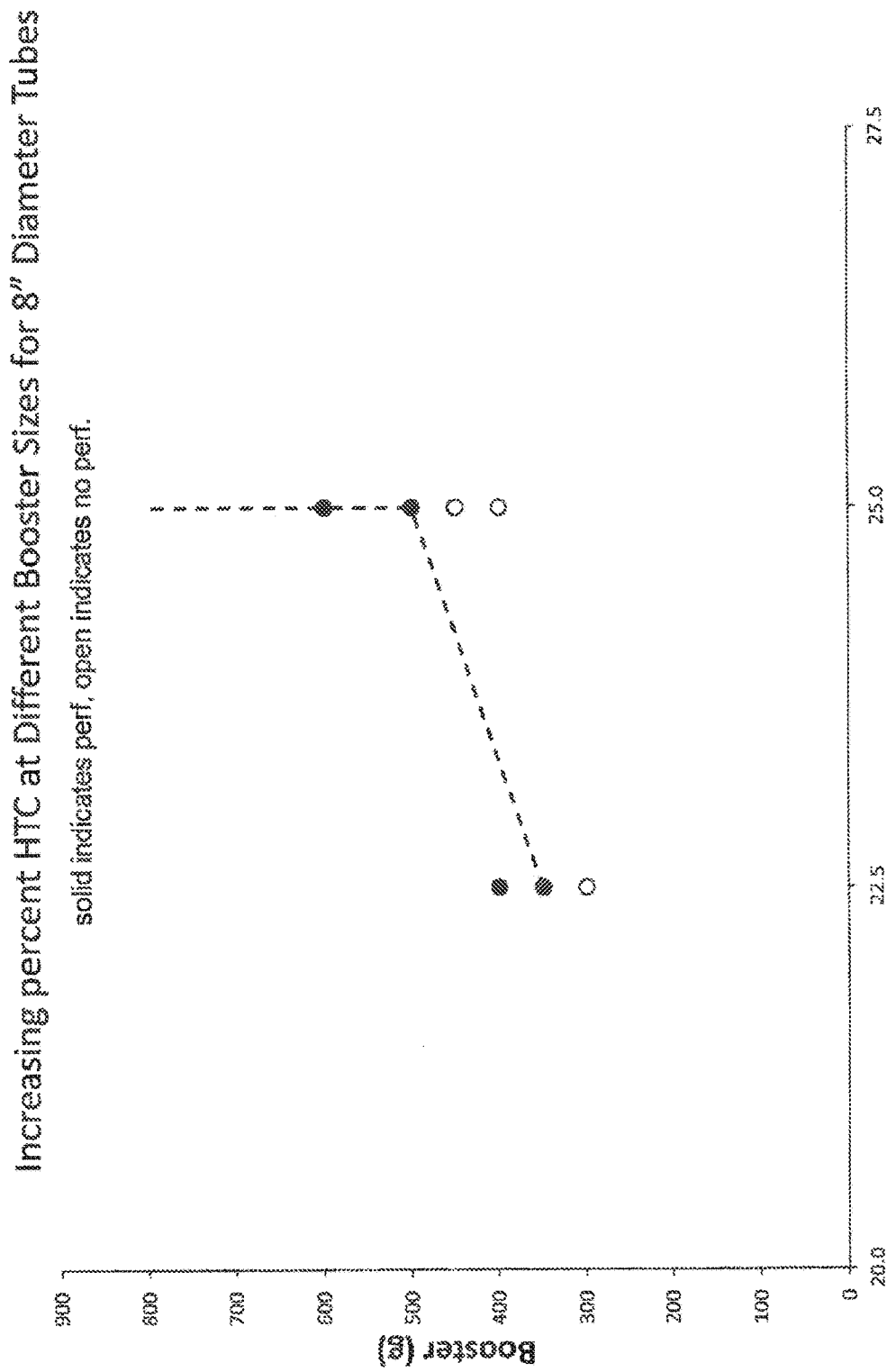

FIG. 19 is a graph that depicts perforating versus non-perforating of stabilizer materials at different booster charge and percent stabilizer material at 8" diameter. Solids symbols indicate perforation; open symbols depicts non perforation.

Figure 20:
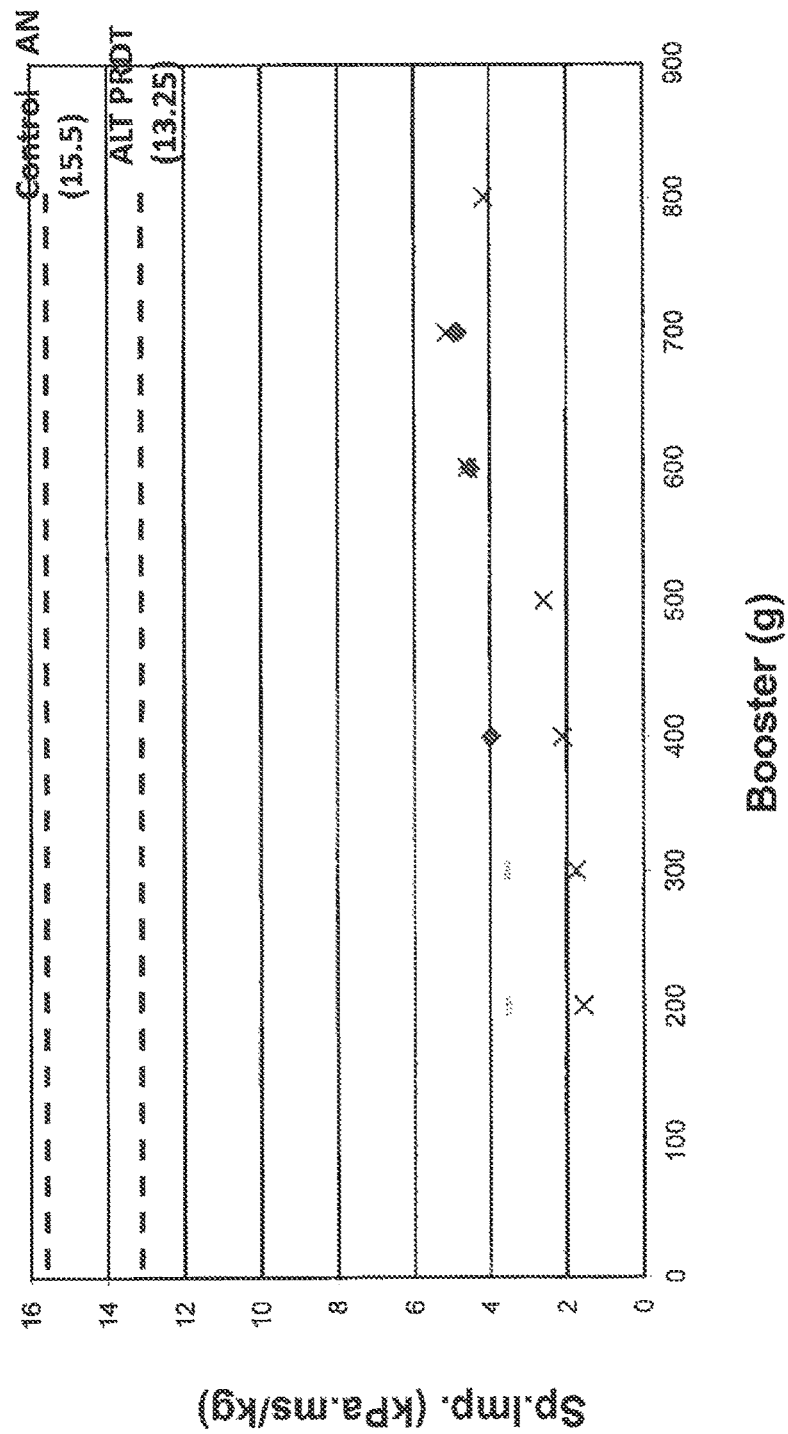

FIG. 20 is a graph that depicts specific impulse at different booster charge for HTC $PO_4$ at different concentration; X=25%; dash=20%; diamond=22.5%. The graph also illustrates the specific impulse of alternate product (ALT PRDT) at 13.25 kPa·ms/kg and control-AN at 15.5 kPa·ms/kg.

DETAILED DESCRIPTION

Example: Thermodynamic Calculations

A series of isenthalpic equilibrium calculations were performed on mixtures of different materials in combination with ammonium nitrate. In this method, a mixture is put into a "box" that retains all of the energy of the system. The equilibrium chemical composition of the mixture was calculated via a computer model and the energy released causes the system temperature to rise.

In completing the computer model and performing the calculation in this way, pure ammonium nitrate decomposes into $N_2$, $H_2$, and $H_2O$ (all lower energy than AN) and the energy that is released increase the gas temperature (i.e. in the box) to 970° C. Addition of other components to the system can now be explored to see their effect on the final system temperature. For example, a 1:1 mixture of AN and $SiO2$ will result in the final composition of $N_2$, $H_2$, $H_2O$ and $SiO_2$ at 604° C. The lower temperature is due to the presence of the $SiO_2$ as an inert material that absorbs some of the energy released from AN decomposition. The energy absorption can be enhanced if the stabilizer material itself is not inert, but can react to change state (and/or degrade to form other compounds). For example, a 1:1 mixture of AN with chalk (CaCO3) gives a final composition $N_2$, $H_2$, $H_2O$, CaO, and $CO_2$ at a temperature of 585° C. Some of the AN decomposition energy is used to convert chalk to lime (CaO) and $CO_2$ via the endothermic reaction $CaCO_3 \rightarrow CaO + CO_2$.

In some embodiments, bauxite residue (BR) is a mixture of inert materials ($SiO_2$, $TiO_2$, $Fe_2O_3$, etc.) and components which may act as "energy absorbers" ($Al(OH)_3$, AlOOH, $Fe_2O_3$, $H_2O$, etc.) the final system temperature for a 1:1 mixture of AN+BR is 711° C. In addition to BR, a number of other materials were evaluated as energy absorbers. The best performer (i.e. at a 1:1 mix) is Bayer process hydrate ($Al(OH)_3$) with a final system temperature of 233° C. Some other attractive materials could be hydrated lime ($Ca(OH)_2$) and gypsum ($CaSO_4 * 2H_2O$). The results of the energy absorption performance calculations are summarized in the following table below, where the lower the final temperature, the "better" the performance.

| Material* | Final Temp (° C.) | % Reduction |
|---|---|---|
| AN Control ($NH_4NO_3$) | 970 | N/A - Control |
| Bauxite Residue (mixed metal oxides, as above) | 711 | 27% |
| Bayer Process Hydrate ($Al(OH)_3$) | 233 | 76% |
| Silicon Dioxide ($SiO_2$) | 601 | 38% |
| Calcium Carbonate ($CaCO_3$) | 585 | 40% |
| Calcium Sulfate Hydrate ($CaSO_4 * 2H_2O$) | 369 | 62% |
| Calcium Hydroxide ($Ca(OH)_2$) | 497 | 51% |

*Control was 100% AN, all other "Materials" modeled were in a 1:1 concentration with AN All additions to AN performed better (resulted in lower equilibrium temperatures) as compared to the pure AN and some additions to AN performed better than others. Percent reductions in equilibrium temperature were computed for the isenthalpic models, and the percent reduction values ranged from a 27% reduction (bauxite residue) to a 76% reduction (aluminum hydroxide). The general trends observed from the computer modeling of isenthalpic equilibrium of various AN data were used to down-select constituents as stabilizer materials to AN fertilizer. Without being bound by a particular mechanism or theory, it is believed that if a constituent of a material lowered the isenthalpic equilibrium temperature, then the resulting material would also potentially prevent the combustion of ammonium nitrate (and thus, potentially provides a blast suppression and/or desensitization mechanism to ammonium nitrate fertilizer(s)). For example, constituents having metal oxides, hydrates, carbonates, and hydroxides were explored as fertilizer compositions (i.e. experiments performed include blast tests to explore potential of blast suppression and/or desensitization of stabilizer materials in AN fertilizer).

Example: Standard Operating Procedure for Blast Tests

Figure 1:
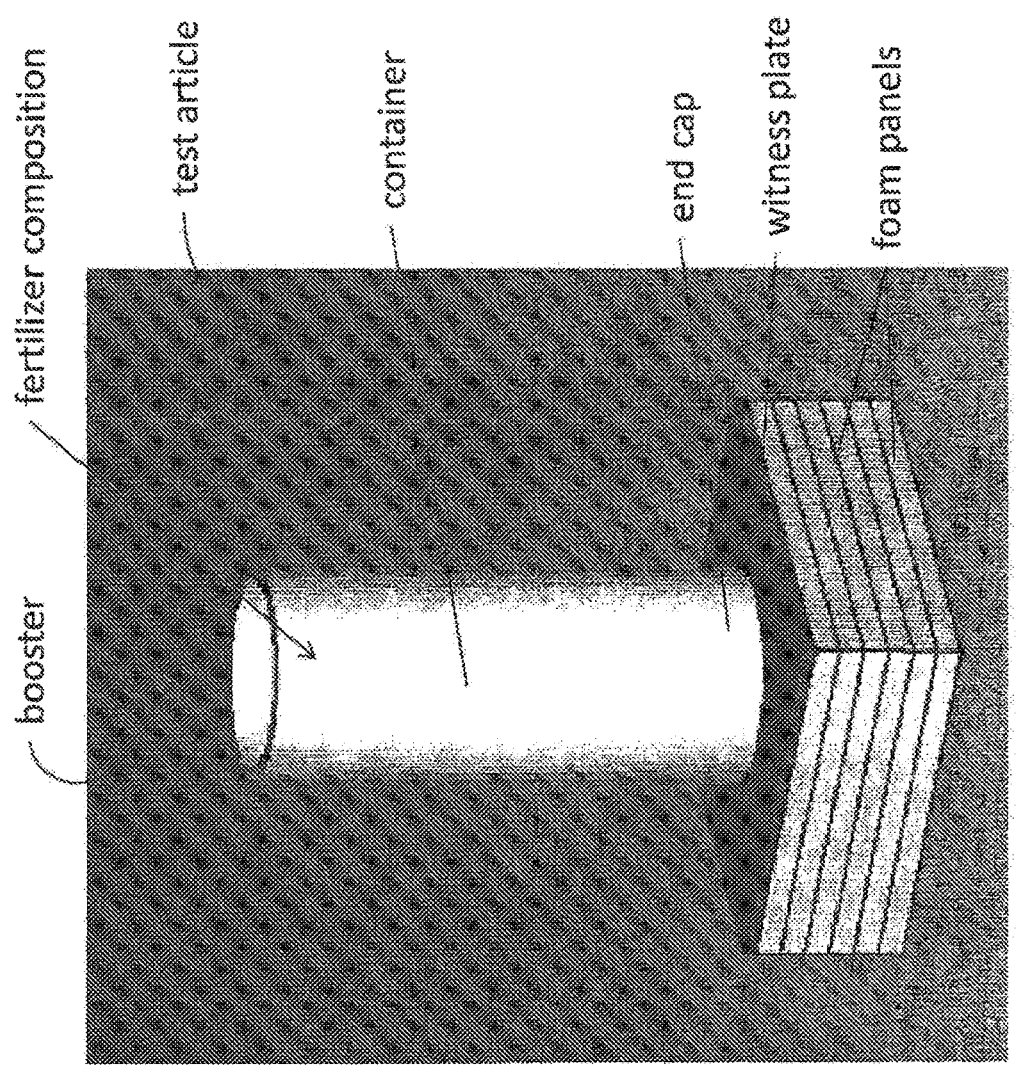
FIG. 1 depicts a schematic of an embodiment of a blast test article in accordance with the instant disclosure.
Figure 2:
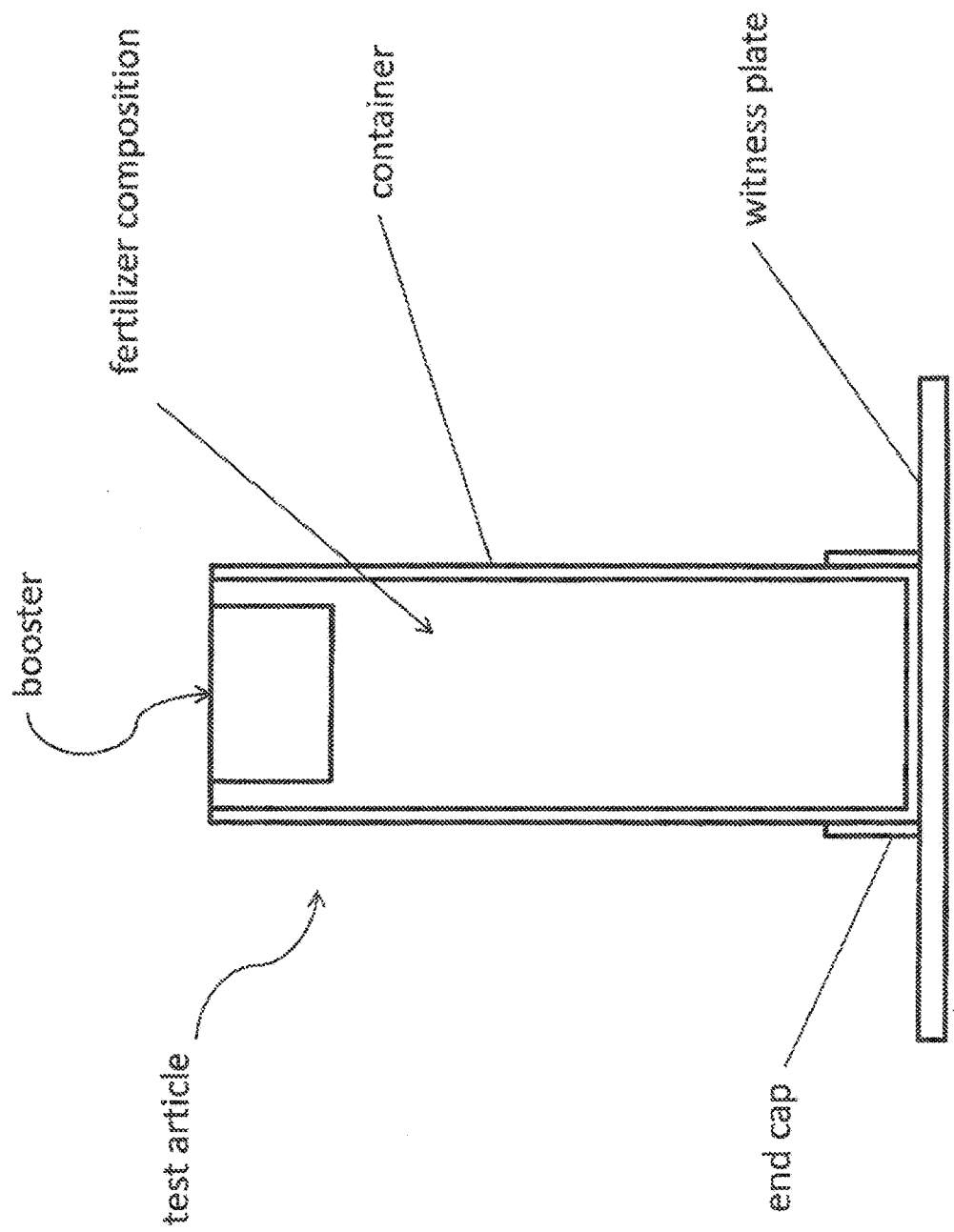
FIG. 2 depicts a schematic cut-away side view of the blast test article of FIG. 1, depicting the booster and fertilizer composition to be tested.
Figure 3:
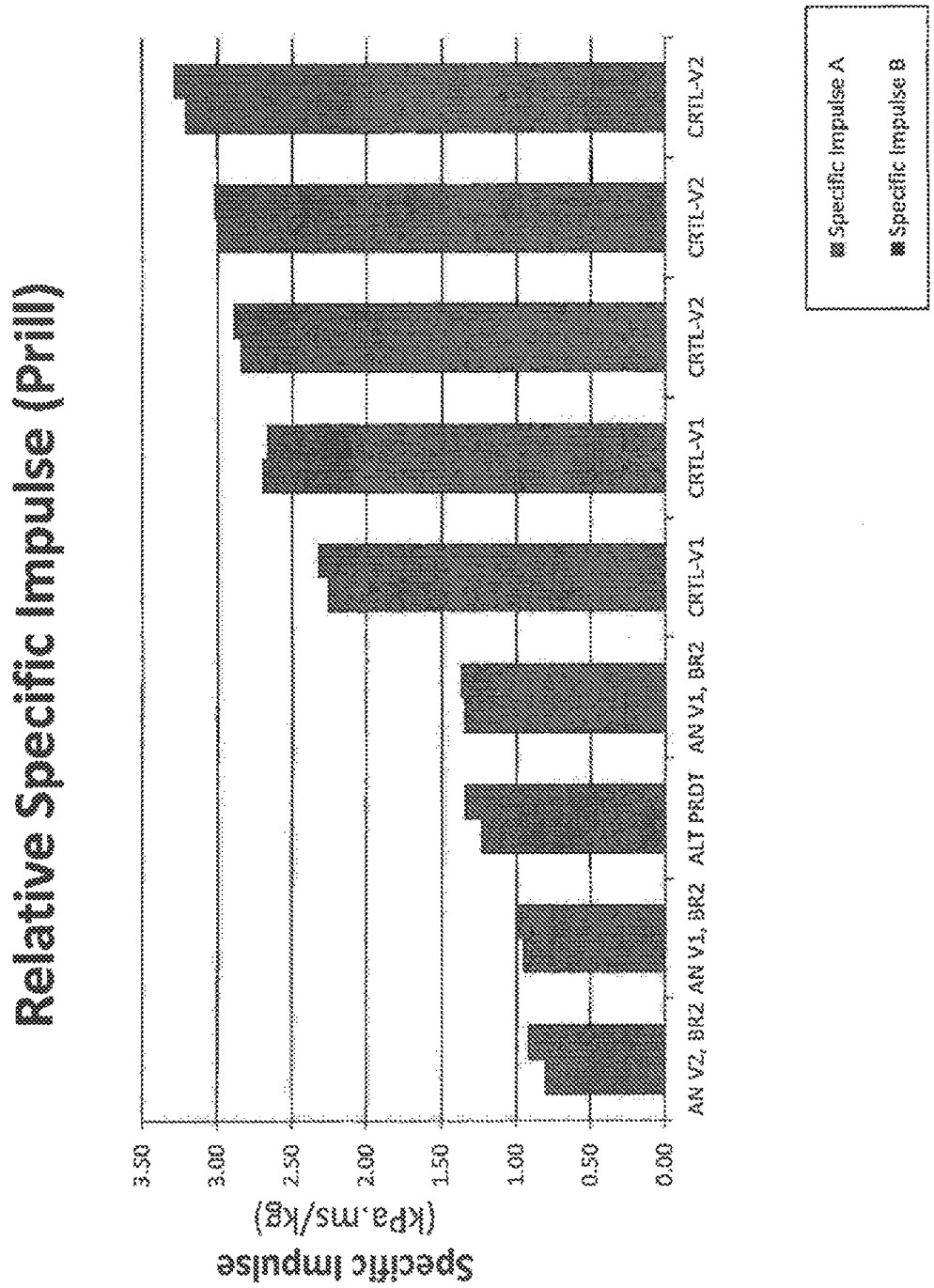
FIG. 3 is a chart depicting the relative specific impulse of prilled fertilizer compositions, with the specific impulse from each overpressure sensor. For prilled samples, referring to FIG. 3, blast tests were completed and specific impulse values were calculated for multiple test articles including: two test articles with commercially available AN fertilizer from vendor 1 (Control 1); three test articles with commercially available AN fertilizer from vendor 2 (Control 2); one test article with a commercially available "blast resistant" AN fertilizer; two test articles of AN fertilizer from vendor 1 coated with bauxite residue (having 15 wt. % phosphate from a neutralization step with phosphoric acid), and one test article of AN fertilizer from vendor 2 coated with bauxite residue (having 15 wt. % phosphate). As depicted in FIG. 3, BR coated prills performed better than any of the commercially available AN prills, with two test articles of BR coated prills out-performing the commercially available "blast resistant" fertilizer.

Test articles refer to the container (PVC pipe), a mild steel plate (called a witness plate), fertilizer composition (stabilizer material and AN mixed with 6 wt. % fuel oil of AN), and a booster (includes C4 explosive in a plastic storage cup). A schematic of a test article is depicted in FIG. 1, while the innards of each test article, including the detonator, booster, and fertilizer composition are shown in FIG. 2.

Sample Preparation:

To make a fertilizer composition for the test article, ammonium nitrate fertilizer prills were dry ground using a ball mill to make a less than 20 mesh (<800 micrometers). Then, the AN powder was dry blended with the stabilizer material powder.

Samples containing iHTC with phosphate had a 15 wt. % phosphate. Bauxite residue samples had either phosphate (i.e. 5-10% wt. %) or nitrate (i.e. 5-10 wt. %) Sample mixtures were dry weighed, and fuel oil was added (6 wt. %) in accordance with the AN content. For all tests, the contents of each article included a ratio of 6% fuel oil to 94% ammonium nitrate (based on mass). The resulting fertilizer/fuel oil composition was mixed/blended for at least 30 minutes and checked for caking with visual observation.

Each test article was weighed empty using a scale with an accuracy of +/−0.2 grams. The resulting mixture was added to each container (PVC with glued end cap) to within 25 mm of top edge. Each filled test article (ammonium nitrate and stabilizer material, mixed with fuel oil) was weighed on a scale having an accuracy of +/−0.1 ounce.

Each test article was left to stand for at least 12 hours prior to testing with a covering (e.g. plastic bag) applied to prevent ambient moisture from entering the test article. Just prior to testing, the booster (C4 in a plastic cup) was inserted flush with the top of the pipe, with the detonator wire attached to the booster.

Boosters for each test article were prepared in small plastic storage cups. A predetermined amount of C4 was measured into each cup. A C4 booster was added to a 5" diameter tube with blast material to be tested. The total weight of the tube was approximately eight kg (including the blast material).

Each test article included a 0.25 inch thick mild steel plate (called a witness plate), with a PVC Pipe, base/end cap. However, the base caps were domed and would not sit vertically on the witness plate. An additional section of 6" PVC pipe, ~3" in length was cut (split) and slipped over the outer surface of the test article. This piece provided good stability to the test article for filling and testing. The test article was placed onto a 4½" stack thick piece of foam (12 inches×12 inches) on a level sand pit.

Filled test articles were placed onto witness plates and positioned and centered on the witness plate. Cable (Cat6 cable) was routed from the shelter to Over Pressure probes.

The detonator was placed into the booster, the charge was armed, and the booster was detonated. For each test article, the detonator was Exploding Bridge Wire (EBW) Type RP-83.

Blast suppression was measured via two blast pressure probes (PCB model), positioned at a distance of 7 m from the test article. Coaxial cable ran from each probe (2-channel, 12 bit, IEPE, 100 kHz) to a computer. Steel rods were positioned between the probes and the target (i.e. test article) to deflect any possible shrapnel.

For each test, two blast pressure probes were used to measure the pressure versus time of each explosion (kPa*ms). The resulting pressure readings were used to compute the specific impulse of the fertilizer composition for each test article. Blast overpressure (i.e. impulse pressure) was collected for each test article.

This data was then integrated by standard means and then divided by the amount of ammonium nitrate present to generate a "specific impulse" (i.e. maximum pressure reading for each blast test impulse). These were then measured against a reference specific impulse of ANFO itself or ammonium nitrate combined with other fuels.

Without being bound by a particular mechanism or theory, stabilizer materials with a specific impulse at approximately the same level as the baseline (AN controls) are considered "inert", in that it is believed that these materials affect the impulse at the same levels as the concentration dictates (i.e. operate by a mechanical "filler" mechanism).

Without being bound by a particular mechanism or theory, measurements below the baseline results are considered "suppressants", in that it is believed that these materials affect the impulse by a chemical reaction or mechanism independent, or in combination with, a dilution factor.

Example: Blast Test—Ground Vs. Coated Prilled Ammonium Nitrate

It is noted that test articles which had materials that were powdered (ground to a fine texture) produced higher specific impulse values than materials that were produced with prills.

| Prill Test Articles | Specific Impulse A | Specific Impulse B | Average Specific Impulse (kPa · ms/kg) |
|---|---|---|---|
| AN V2, BR2 | 0.81 | 0.92 | 0.86 |
| AN V1, BR2 | 0.95 | 1.00 | 0.98 |
| ALT PRDT | 1.23 | 1.34 | 1.29 |
| AN V1, BR2 | 1.34 | 1.37 | 1.36 |
| CRTL-V1 | 2.26 | 2.32 | 2.29 |
| CRTL-V1 | 2.70 | 2.66 | 2.68 |
| CRTL-V2 | 2.85 | 2.89 | 2.87 |
| CRTL-V2 | 3.01 | 3.02 | 3.01 |
| CRTL-V2 | 3.21 | 3.29 | 3.25 |

| Ground Test Articles | Specific Impulse A | Specific Impulse B | Average Specific Impulse (kPa · ms/kg) |
|---|---|---|---|
| AN V1, BR1 | 12.67 | 12.60 | 12.64 |
| ALT PRDT | 12.02 | 12.47 | 12.25 |
| AN V1, BR1 | 13.31 | 13.32 | 13.31 |
| AN V2, BR2 | 14.50 | 14.49 | 14.49 |
| AN V2, BR2 | 14.63 | 14.79 | 14.71 |
| CTRL-V2 | 14.97 | 15.51 | 15.24 |
| CTRL-V1 | 15.29 | 15.27 | 15.28 |
| CTRL-V1 | N/A* | 15.49 | 15.49 |
| CTRL-V2 | 15.52 | 15.65 | 15.58 |
| CTRL-V2 | 15.80 | 15.67 | 15.74 |

N/A* = probe was disconnected - no reading was obtained

Example: Blast Test—Different Stabilizer Materials

In order to identify stabilizer materials with blast suppression and/or desensitization characteristics, various stabilizer materials were tested (each at 25 wt. %), in a 5" diameter tube with 200 g booster. The specific impulse was calculated for each test article and is presented in the table below, which also provides the mean impulse (obtained as an average of the overpressure sensor measurements from each detonation) and the visual observation of the state of the witness plate (perforated, non-perforated).

| # | Stabilizer materials | Sp. Imp. (kPa * ms/kg) | Mean Impulse (kPa * ms) | Witness Plate | Impulse 1 (kPa * ms) | Impulse 2 (kPa * ms) |
|---|---|---|---|---|---|---|
| 1 | AN | 14.7 | 110.9 | perf | 108.7 | 113.1 |
| 2 | AN | 14.7 | 111.5 | perf | 109.6 | 113.3 |
| 3 | AN | 14.2 | 108.8 | perf | 107.5 | 110.1 |
| 4 | AN | 14.3 | 110.9 | perf | 108.8 | 113.1 |
| 5 | Bauxite | 12.1 | 84.2 | perf | 83.1 | 85.3 |
| 6 | Bauxite | 13.2 | 86.5 | perf | 85.3 | 87.8 |
| 7 | Bauxite | 13.3 | 87.0 | perf | 85.1 | 88.8 |
| 8 | Bauxite | 12.2 | 83.5 | perf | 81.6 | 85.5 |
| 9 | BR1 (NO3) | 15.1 | 90.4 | perf | 87.9 | 92.8 |
| 10 | BR1 (NO3) | 14.4 | 86.7 | perf | 85.9 | 87.4 |
| 11 | BR1 (NO3) | n/a | n/a | no perf | n/a | n/a |
| 12 | BR1 (NO3) | 15.3 | 90.5 | perf | 88.9 | 92.0 |
| 13 | BR2 (PO4) | 12.7 | 86.1 | perf | 85.2 | 87.1 |
| 14 | BR2 (PO4) | 11.9 | 83.7 | perf | 82.0 | 85.4 |
| 15 | BR2 (PO4) | n/a | n/a | no perf | n/a | n/a |
| 16 | BR2 (PO4) | 12.4 | 85.1 | perf | 83.3 | 86.9 |
| 17 | HTC-CO3 | 0.0 | 19.3 | no perf | 18.9 | 19.7 |
| 18 | HTC-CO3 | −0.2 | 18.3 | no perf | 18.2 | 18.4 |
| 19 | HTC-CO3 | 0.0 | 19.3 | no perf | 18.7 | 19.8 |
| 20 | HTC-PO4 | 0.9 | 23.2 | no perf | 22.9 | 23.5 |
| 21 | HTC-PO4 | 0.6 | 22.2 | no perf | 21.9 | 22.6 |
| 22 | HTC-PO4 | 1.2 | 24.6 | no perf | 24.2 | 25.1 |
| 23 | HTC-PO4 | 1.0 | 23.9 | no perf | 23.9 | n/a |
| 24 | Hydrate | 13.5 | 83.7 | perf | 82.7 | 84.8 |
| 25 | Hydrate | 13.4 | 83.2 | perf | 81.8 | 84.7 |
| 26 | Hydrate | 13.3 | 81.8 | perf | 79.7 | 83.9 |
| 27 | Hydrate | 13.2 | 80.2 | perf | 78.4 | 81.9 |
| 28 | Oxalate | 13.5 | 81.6 | perf | 80.3 | 83.0 |
| 29 | Oxalate | 12.9 | 80.8 | perf | 79.4 | 82.2 |
| 30 | Oxalate | 13.4 | 81.3 | perf | 79.9 | 82.7 |
| 31 | Oxalate | 13.4 | 83.1 | perf | 80.3 | 85.9 |
| 32 | Sand | 14.5 | 91.6 | perf | 90.0 | 93.2 |
| 33 | Sand | 14.4 | 91.2 | perf | 89.7 | 92.7 |
| 34 | Sand | 13.8 | 90.7 | perf | 88.9 | 92.4 |
| 35 | Sand | 13.3 | 87.6 | perf | 85.9 | 89.4 |
| 36 | SGA | 10.8 | 74.0 | perf | 73.3 | 74.7 |
| 37 | SGA | 9.7 | 71.9 | perf | 70.8 | 73.0 |
| 38 | SGA | 9.8 | 71.2 | perf | 69.2 | 73.1 |
| 39 | SGA | 10.7 | 73.3 | perf | 72.1 | 74.6 |

It is noted that for runs 11 and 15, the booster (C4) did not detonate, which resulted in no perforation of the witness plate.

In order to account for the booster shot in the specific impulse calculation, multiple booster shots (6) were completed at various amounts of booster. The results were linear—as the amount of booster increased, so too did the resulting specific impulse.

Example: Blast Test—Blast Suppression and Desensitization

In order to identify blast suppression and desensitization parameters, three variables were tested under this set of experiments, including:
(1) fertilizer composition (i.e. AN+(a) stabilizer material 1 (HTC at different wt. %), (2) stabilizer material 2 (apatite), and (3) stabilizer material 3 (combined 15 HTC/10BR);
(2) booster size/quantity (e.g. 200 g, 300 g, 400 g, 600 g, 800 g); and
(3) tube diameter of the test article (i.e. 5 inch, 6 inch, or 8 inch diameter).

| # | Sample | Diluent (%) | Booster (g) | Tube (in) | Witness Plate | Sp. Imp. (kPa · ms/kg) |
|---|---|---|---|---|---|---|
| 1 | HTC | 10 | 200 | 5 | Perf | 13.68 |
| 2 | HTC | 15 | 400 | 5 | Perf | 12.66 |

-continued

| # | Sample | Diluent (%) | Booster (g) | Tube (in) | Witness Plate | Sp. Imp. (kPa · ms/kg) |
|---|---|---|---|---|---|---|
| 3 | HTC | 15 | 200 | 5 | Perf | 10.61 |
| 4 | HTC | 15 | 200 | 5 | Perf | 13.61 |
| 5 | HTC | 17.5 | 200 | 5 | Perf | 12.92 |
| 6 | HTC | 20 | 200 | 6 | Perf | 11.48 |
| 7 | HTC | 20 | 200 | 6 | Perf | 12.44 |
| 8 | HTC | 20 | 500 | 5 | Perf | 12.40 |
| 9 | HTC | 20 | 400 | 5 | Perf | 12.08 |
| 10 | HTC | 20 | 400 | 5 | Perf | 9.29 |
| 11 | HTC | 22.5 | 400 | 6 | Perf | 11.41 |
| 12 | HTC | 22.5 | 400 | 8 | Perf | 9.64 |
| 13 | HTC | 22.5 | 350 | 8 | Perf | 10.30 |
| 14 | HTC | 25 | 600 | 8 | Perf | 9.43 |
| 15 | HTC | 25 | 500 | 8 | Perf | 8.11 |
| 16 | HTC | 20 | 200 | 5 | No perf | 3.53 |
| 17 | HTC | 20 | 300 | 5 | No perf | 3.57 |
| 18 | HTC | 22.5 | 400 | 5 | No perf | 3.99 |
| 19 | HTC | 22.5 | 600 | 5 | No perf | 4.52 |
| 20 | HTC | 22.5 | 700 | 5 | No perf | 4.86 |
| 21 | HTC | 22.5 | 300 | 6 | No perf | 2.66 |
| 22 | HTC | 22.5 | 300 | 8 | No perf | 4.02 |
| 23 | HTC | 25 | 200 | 5 | No perf | 1.56 |
| 24 | HTC | 25 | 300 | 5 | No perf | 1.76 |
| 25 | HTC | 25 | 400 | 5 | No perf | 2.10 |
| 26 | HTC | 25 | 500 | 5 | No perf | 2.60 |
| 27 | HTC | 25 | 600 | 5 | No perf | 4.59 |
| 28 | HTC | 25 | 700 | 5 | No perf | 5.15 |
| 29 | HTC | 25 | 400 | 6 | No perf | 2.79 |
| 30 | HTC | 25 | 600 | 6 | No perf | 2.50 |
| 31 | HTC | 25 | 400 | 8 | No perf | 4.12 |

| # | Sample | Diluent (%) | Booster (g) | Tube (in) | Witness Plate | Sp. Imp. (kPa · ms/kg) |
|---|---|---|---|---|---|---|
| 32 | HTC | 25 | 450 | 8 | No perf | 4.25 |
| 33 | HTC | 25 | 400 | 5 | No perf | 2.86 |
| 34 | HTC | 25 | 600 | 5 | No perf | 3.48 |
| 35 | HTC | 25 | 400 | 5 | No perf | 2.01 |
| 36 | HTC | 25 | 600 | 5 | No perf | 2.49 |
| 37 | HTC | 25 | 800 | 5 | No perf | 4.17 |
| 38 | Apatite | 25 | 200 | 5 | No perf | 1.74 |
| 39 | Apatite | 25 | 400 | 5 | No perf | 2.19 |
| 40 | 15HTC/10BR | 25 | 200 | 5 | No perf | 1.41 |
| 41 | 15HTC/10BR | 25 | 400 | 5 | No perf | 2.32 |

In order to account for the booster shot in the specific impulse calculation, multiple booster shots (16) were completed at various amounts of booster. The results were linear—as the amount of booster increased, so too did the resulting specific impulse.

It is noted that the BR in runs 40 and 41 had a phosphate content of 5-15 wt. %.

It is noted that runs 33-36 had increased fuel oil in the fertilizer composition. Run 33 and 34 were 50% fuel oil (i.e. 9 wt % fuel oil compared to AN content) and runs 35 and 36 were 100% fuel oil (i.e. 12 wt. % fuel oil, as compared to AN content).

Data Comparison:

The below table illustrates all stabilizer materials in ground form at the standard operating procedure of 5" diameter and 200 g booster size; with the exception of HTC-PO4-22.5%. This sample was a 5" tube with booster sizes of 300, 400, 600, and 700.

| Stabilizer material | Sp. Imp. | Avg. Sp. Imp. | St. Dev. |
|---|---|---|---|
| BR1-($PO_4$) | 12.64 | 12.98 | 0.48 |
| | 13.31 | | |
| Bauxite-25% | 12.1 | 12.7 | 0.6 |
| | 12.2 | | |
| | 13.2 | | |
| | 13.3 | | |
| Oxalate-25% | 12.9 | 13.3 | 0.3 |
| | 13.4 | | |
| | 13.4 | | |
| | 13.5 | | |
| Apatite-25% | 1.7 | 1.7 | |
| HTC-$PO_4$-15%/BR-10% | 1.4 | 1.4 | |
| BR2 | 14.49 | 14.60 | 0.15 |
| | 14.71 | | |
| BR1-($NO_3$) | 14.4 | 14.9 | 0.4 |
| | 15.1 | | |
| | 15.3 | | |
| BR2-$PO_4$ | 11.9 | 12.3 | 0.4 |
| | 12.4 | | |
| | 12.7 | | |
| SGA-25% | 9.7 | 10.2 | 0.6 |
| | 9.8 | | |
| | 10.7 | | |
| | 10.8 | | |
| Hydrate-25% | 13.2 | 13.3 | 0.1 |
| | 13.3 | | |
| | 13.4 | | |
| | 13.5 | | |
| Sand-23% | 13.3 | 14.0 | 0.5 |
| | 13.8 | | |
| | 14.4 | | |
| | 14.5 | | |
| HTC-$CO_3$-25% | −0.2 | 0.0 | 0.1 |
| | 0.0 | | |
| | 0.0 | | |
| HTC-$PO_4$-22.5% | 2.7 | 6.4 | 3.4 |
| | 4.0 | | |
| | 4.0 | | |
| | 4.5 | | |
| | 4.9 | | |
| | 9.6 | | |
| | 10.3 | | |
| | 11.4 | | |
| HTC-$PO_4$-17.5% | 12.9 | 12.9 | |
| HTC-$PO_4$-25% | 0.6 | 1.2 | 0.4 |
| | 0.9 | | |
| | 1.0 | | |
| | 1.2 | | |
| | 1.6 | | |
| | 1.8 | | |
| HTC-$PO_4$-10% | 13.7 | 13.7 | |
| HTC-$PO_4$-15% | 10.6 | 12.3 | 1.5 |
| | 12.7 | | |
| | 13.6 | | |
| HTC-$PO_4$-20% | 3.5 | 9.3 | 4.4 |
| | 3.6 | | |
| | 11.5 | | |
| | 12.1 | | |
| | 12.4 | | |
| | 12.4 | | |
| AN | 14.2 | 15.02 | 0.57 |
| | 14.3 | | |
| | 14.7 | | |
| | 14.7 | | |
| | 15.24 | | |
| | 15.28 | | |
| | 15.49 | | |
| | 15.58 | | |
| | 15.74 | | |
| CAN-27-G | 13.25 | 13.25 | |

For the following three sets of blast data, we note the hydrotalcite, hydrocalumite, red lime, and hydroxyapatite materials were obtained from an alumina refining process, unless otherwise indicated (i.e. "synthetic" refers to materials obtained via a commercial vendor).

As these materials were obtained via an alumina refining process, analytical data was compiled in order to better understand the characteristics of the aluminum byproduct material (e.g. as compared to commercially available alternatives with high purity and low to no unavoidable minor components). Below, the analytical data is set forth for the materials obtained via the alumina refining process, with minor variations depicted for different batches of the same material.

Two batches of hydrotalcite were utilized in the following three blast tests. For the first batch of hydrotalcite: the density was measured at 2.1135 g/cc, while the surface area was 30.8 m2/g. The average particle size was measured at 12.98 microns. The x-ray diffraction noted the following components: Major: $Mg_4Al_2(OH)_{14}.3H_2O$, Magnesium Aluminum Hydroxide Hydrate, Meixnerite and/or $Mg_4Al_2(OH)_{12}CO_3.3H_2O$, Magnesium Aluminum Hydroxy Carbonate Hydrate and/or $Mg_6Al_2CO_3(OH)_{16}.4H_2O$, Hydrotalcite, Trace possible: $Ca_3Al_2(OH)_{12}$.

For the second batch of hydrotalcite: the density was measured at 2.0941 g/cc, while the surface area was 29 m2/g. The average particle size was measured at 12.31 microns. The x-ray diffraction noted the following components: Major: $Mg_6Al_2(CO_3)(OH)_{16}.4(H_2O)$, Hydrotalcite and/or $Mg_6Al_2(OH)_{18}.4.5H_2O$, Magnesium Aluminum Hydroxide Hydrate, Trace possible: $Ca_3AlFe(SiO_4)(OH)_8$, Calcium Aluminum Iron Silicate Hydroxide.

For the bauxite residue material, the density was measured at 3.3441 g/cc, while the surface area was 42.3 m2/g. The average particle size was measured at 4.892 microns.

The x-ray diffraction noted the following components: Major: $Fe_2O_3$, Hematite; $CaCO_3$, Calcium Carbonate; Minor: $TiO_2$, Titanium Oxide, Rutile; FeO(OH), Goethite; $Al(OH)_3$, Bayerite; AlO(OH), Boehmite; Trace possible: $Al(OH)_3$, Gibbsite; $Na_8Si_6Al_6O_{24}(OH)_2(H_2O)_2$, Sodium Silicon Aluminate.

For the apatite, two batches were utilized. For the first batch of apatite material, the density was measured at 2.6645 g/cc, while the surface area was 76 m2/g. The average particle size was measured at 5.518 microns. The x-ray diffraction noted the following components: Major: $Ca_{10}(PO_4)_3(CO_3)_3(OH)_2$, Calcium Carbonate Phosphate Hydroxide; $Mg_6Al_2(CO_3)(OH)_{16}.4(H_2O)$, Hydrotalcite and/or $Mg_6Al_2(OH)_{18}.4.5H_2O$, Magnesium Aluminum Hydroxide Hydrate, with Minor possible: $CaCO_3$, Calcium Carbonate.

For the second batch of apatite material, the density was measured at 2.6443 g/cc, while the surface area was 89 m2/g. The average particle size was measured at 5.367 microns. The x-ray diffraction noted the following components: Major: $Ca_{10}(PO_4)_3(CO_3)_3(OH)_2$, Calcium Carbonate Phosphate Hydroxide; $Mg_6Al_2(CO_3)(OH)_{16}.4(H_2O)$, Hydrotalcite and/or $Mg_6Al_2(OH)_{18}.4.5H_2O$, Magnesium Aluminum Hydroxide Hydrate, Minor possible: $CaCO_3$, Calcium Carbonate.

For the red lime, two batches were utilized.

For the first batch of red lime material, the density was measured at 2.5621 g/cc, while the surface area was 4.1 m2/g. The average particle size was measured at 20.62 microns. The x-ray diffraction noted the following components: Major: $CaCO_3$, Calcium Carbonate. Minor: $Ca_3AlFe(SiO_4)(OH)_8$, Calcium Aluminum Iron Silicate Hydroxide. Very Small: $Ca(OH)_2$, Calcium Hydroxide. Trace: $Mg_6Al_2(CO_3)(OH)_{16}.4(H_2O)$, Hydrotalcite and/or $Mg_6Al_2(OH)_{18}.4.5H_2O$, Magnesium Aluminum Hydroxide.

For the second batch of red lime material, the density was measured at 2.5658 g/cc, while the surface area was 4.7 m2/g. The average particle size was measured at 12.43 microns. The x-ray diffraction noted the following components: Major: $CaCO_3$, Calcium Carbonate. Minor: $Ca_3AlFe(SiO_4)(OH)_8$, Calcium Aluminum Iron Silicate Hydroxide. Very Small: $Ca(OH)_2$, Calcium Hydroxide. Trace: $Mg_6Al_2(CO_3)(OH)_{16}.4(H_2O)$, Hydrotalcite and/or $Mg_6Al_2(OH)_{18}.4.5H_2O$, Magnesium Aluminum Hydroxide.

Two batches of hydrocalumite were utilized.

For the first batch of hydrocalumite material, the density was measured at 2.2296 g/cc, while the surface area was 10.4 m2/g. The average particle size was measured at 12.21 microns. The x-ray diffraction noted the following components: Major: $Ca(OH)_2$, Calcium Hydroxide; $CaCO_3$, Calcium Carbonate; $Ca_4Al_2(OH)_{12}(CO_3)(H_2O)_5$, Calcium Aluminum Hydroxide Carbonate Hydrate; $Ca_4Al_2O_6Cl_2(H_2O)_{10}$, Hydrocalumite, Minor possible: $Mg_6Al_2(CO_3)(OH)_{16}.4(H_2O)$, Hydrotalcite and/or Mg.

For the second batch of hydrocalumite material, the density was measured at 2.2561 g/cc, while the surface area was 11.71 m2/g. The average particle size was measured at 16.31 microns. The x-ray diffraction noted the following components: Major: $Ca(OH)_2$, Calcium Hydroxide; $CaCO_3$, Calcium Carbonate; $Ca_4Al_2(OH)_{12}(CO_3)(H_2O)_5$, Calcium Aluminum Hydroxide Carbonate Hydrate; $Ca_4Al_2O_6Cl_2(H_2O)_{10}$, Hydrocalumite, Minor possible: $Mg_6Al_2(CO_3)(OH)_{16}.4(H_2O)$, Hydrotalcite and/or Mg.

Example: Blast Test—Blast Suppression and Desensitization

The below table illustrates experimental results from blast tests completed on a control (AN) as compared to two stabilizer materials: hydrotalcite and hydroxyapatite in various forms (e.g. recovered from an alumina production process, synthetic, etc) and at different weight percent.

For this blast test, the fuel was fuel oil for all materials, though the booster size varied (as indicated) and a few of the runs included larger diameter tubes (e.g. 8 inches) as compared to the standard size (5") utilized for many of the runs. The blast test components were prepared as previously indicated, according to the standard operating procedure. The specific impulse readings are provided below, along with a comparative view of the Reduction in Blast, measured as a percentage according to various SI baselines (e.g. 13.5, 10.0, and 8.0). When a blast test did not result in a reduction in specific impulse, the reduction percentage is indicated as "N/A".

| Material | Booster (g) | Dia. (in.) | Sp. Imp. (kPa · ms/kg) | Reduction vs. 13.5 Baseline (%) | Reduction vs. 10.0 Baseline (%) | Reduction vs. 8.0 Baseline (%) |
|---|---|---|---|---|---|---|
| Ammonium Nitrate (control) | 10 | 5 | 15.38 | N/A | N/A | N/A |
| Ammonium Nitrate (control) | 10 | 5 | 15.37 | N/A | N/A | N/A |
| Ammonium Nitrate (control) | 25 | 5 | 15.24 | N/A | N/A | N/A |
| Ammonium Nitrate (control) | 100 | 5 | 15.25 | N/A | N/A | N/A |
| Hydrotalcite 17.5 wt % | 200 | 5 | 1.01 | 92.5 | 89.9 | 87.3 |
| Hydrotalcite 17.5 wt % | 300 | 5 | 7.92 | 41.3 | 20.8 | 1 |
| Hydrotalcite 17.5 wt % | 400 | 5 | 10.91 | 19.2 | N/A | N/A |
| Hydrotalcite 17.5 wt % | 400 | 5 | 3.16 | 76.6 | 68.4 | 60.5 |
| Hydrotalcite 25 wt. % | 400 | 5 | 1.76 | 87 | 82.4 | 78 |
| Hydrotalcite 25 wt. % | 600 | 5 | 1.88 | 86.1 | 81.2 | 76.5 |
| Synthetic Hydrotalcite 17.5 wt % | 200 | 5 | 0.92 | 93.2 | 90.8 | 88.5 |
| Synthetic Hydrotalcite 17.5 wt % | 400 | 5 | 1.57 | 88.4 | 84.3 | 80.4 |
| Synthetic Hydrotalcite 17.5 wt % | 400 | 8 | 2.05 | 84.8 | 79.5 | 74.3 |
| Synthetic Hydrotalcite 17.5 wt % | 600 | 8 | 3.02 | 77.6 | 69.8 | 62.2 |
| Synthetic Hydrotalcite 17.5 wt % | 600 | 8 | 2.87 | 78.7 | 71.3 | 64.1 |
| Synthetic Hydrotalcite 17.5 wt % | 600 | 5 | 2.21 | 83.6 | 77.9 | 72.3 |
| Synthetic Hydrotalcite, cooked 25 wt % | 400 | 5 | 2.9 | 78.5 | 71 | 63.8 |
| Rehydrated Synthetic Hydrotalcite Reground 17.5 wt. % | 200 | 5 | 14.62 | N/A | N/A | N/A |
| Rehydrated Synthetic Hydrotalcite Reground 17.5 wt. % | 200 | 5 | 14.35 | N/A | N/A | N/A |
| Rehydrated Synthetic Hydrotalcite Prill 17.5 wt. % | 400 | 5 | 13.75 | N/A | N/A | N/A |

| Material | Booster (g) | Dia. (in.) | Sp. Imp. (kPa · ms/kg) | Reduction vs. 13.5 Baseline (%) | Reduction vs. 10.0 Baseline (%) | Reduction vs. 8.0 Baseline (%) |
|---|---|---|---|---|---|---|
| Rehydrated Synthetic Hydrotalcite Prill 17.5 wt. % | 200 | 5 | 14.9 | N/A | N/A | N/A |
| Rehydrated Synthetic Hydrotalcite Prill 17.5 wt. % | 200 | 5 | 13.28 | 1.6 | N/A | N/A |
| Hydrotalcite + phosphate 20 wt. % | 200 | 5 | 11.29 | 16.4 | N/A | N/A |
| Hydrotalcite + phosphate 20 wt. % | 200 | 5 | 12.32 | 8.7 | N/A | N/A |
| Hydrotalcite + phosphate 20 wt. % | 400 | 5 | 11.99 | 11.2 | N/A | N/A |
| Hydroxyapatite 10 wt % | 200 | 5 | 13.25 | 1.9 | N/A | N/A |
| Hydroxyapatite 10 wt % | 200 | 5 | 13.13 | 2.8 | N/A | N/A |
| Hydroxyapatite 15 wt. % | 400 | 5 | 5.52 | 59.1 | 44.8 | 30.9 |
| Hydroxyapatite 15 wt. % | 600 | 5 | 9.38 | 30.5 | 6.2 | N/A |
| Hydroxyapatite 20 wt. % | 400 | 5 | 3.16 | 76.6 | 68.4 | 60.5 |
| Hydroxyapatite 20 wt. % | 600 | 5 | 3.8 | 71.8 | 62 | 52.5 |
| Hydroxyapatite 25 wt. % | 200 | 5 | 2.12 | 84.3 | 78.8 | 73.5 |
| Hydroxyapatite 25 wt. % | 400 | 8 | 2.13 | 84.2 | 78.7 | 73.3 |
| Hydroxyapatite 25 wt. % | 600 | 5 | 2.68 | 80.1 | 73.2 | 66.5 |
| Hydroxyapatite 25 wt. % | 700 | 5 | 2.82 | 79.1 | 71.8 | 64.7 |
| Hydroxyapatite 25 wt. % | 700 | 5 | 2.43 | 82 | 75.7 | 69.6 |
| Hydroxyapatite 25 wt. % | 600 | 8 | 0.24 | 98.2 | 97.6 | 97 |
| Hydroxyapatite 25 wt. % | 700 | 8 | 5.13 | 62 | 48.7 | 35.9 |
| Hydroxyapatite 25 wt. % | 700 | 8 | 4.44 | 67.1 | 55.6 | 44.4 |

Example: Blast Test—Blast Suppression and Desensitization

The below table illustrates experimental results from blast tests completed on various materials, in which stabilizer and combinations of stabilizers and fillers were evaluated against a control SI baseline (ammonium nitrate). Materials evaluated for this blast test included: red lime (individually and in combination with bauxite residue at different weight percentages), hydrocalumite (individually and in combination with bauxite residue at different weight percentages), hydroxyapatite (individually and in combination with bauxite residue at different weight percentages), hydrotalcite (individually and in combination with bauxite residue at different weight percentages), a combination of hydrotalcite and hydroxyapatite (individually and in combination with bauxite residue at different weight percentages).

For this blast test, the hydrotalcite and hydroxyapatite were recovered from an alumina production process. The standard operating procedure was followed to prepare the blast components and complete the blast tests, while other variables were modified: i.e. the diameter of the tube (8" vs. 12"), the amount of booster (200 g, 400 g, 450 g), and the type of fuel (i.e. fuel oil (FO), AL (aluminum)).

The specific impulse readings are provided below, along with a comparative view of the Reduction in Blast, measured as a percentage according to various SI baselines (e.g. 13.5, 10.0, and 8.0). When a blast test did not result in a reduction in specific impulse, the reduction percentage is indicated as "N/A".

| Material | Booster (g) | Dia. (in.) | Fuel | Sp. Imp. (kPa · ms/kg) | Reduction vs. 13.5 Baseline (%) | Reduction vs. 10.0 Baseline (%) | Reduction vs. 8.0 Baseline (%) |
|---|---|---|---|---|---|---|---|
| Ammonium Nitrate | 450 | 12 | AL | 13.98 | N/A | N/A | N/A |
| Hydrocalumite 20 wt % | 450 | 12 | AL | 5.13 | 62.0 | 48.7 | 35.9 |
| Hydrocalumite 20 wt. % | 200 | 8 | FO | 1.61 | 88.1 | 83.9 | 79.9 |
| Hydrocalumite 20 wt. % | 200 | 8 | FO | 1.99 | 85.2 | 80.1 | 75.1 |
| Hydrocalumite 20 wt. % | 200 | 8 | FO | 1.34 | 90.1 | 86.6 | 83.3 |
| Hydrocalumite 15 wt. % | 200 | 8 | FO | 3.78 | 72.0 | 62.2 | 52.8 |
| Hydrocalumite 15 wt. % | 200 | 8 | FO | 4.17 | 69.1 | 58.3 | 47.9 |
| Hydrocalumite 15 wt. % | 400 | 8 | FO | 7.84 | 41.9 | 21.6 | 2.0 |
| Hydrocalumite 15 wt % + bauxite residue 5 wt % | 450 | 12 | FO | 8.68 | 35.7 | 13.2 | N/A |
| Hydrocalumite 2.5 wt. % + bauxite residue 17.5 wt % | 450 | 12 | AL | 14.78 | N/A | N/A | N/A |
| Red Lime 20 wt. % | 200 | 8 | FO | 3.68 | 72.7 | 63.2 | 53.9 |
| Red Lime 20 wt. % | 200 | 8 | FO | 5.39 | 60.1 | 46.1 | 32.7 |
| Red Lime 20 wt. % | 400 | 8 | FO | 12.45 | 7.8 | N/A | N/A |
| Red Lime 15 wt. % | 200 | 8 | FO | 15.21 | N/A | N/A | N/A |
| Red Lime 15 wt. % | 200 | 8 | FO | 13.40 | 0.7 | N/A | N/A |
| Red Lime 15 wt. % + bauxite residue 5 wt % | 200 | 8 | FO | 9.21 | 31.8 | 7.9 | N/A |
| Red Lime 15 wt. % + bauxite residue 5 wt % | 200 | 8 | FO | 5.26 | 61.0 | 47.4 | 34.2 |
| Red Lime 15 wt. % + bauxite residue 5 wt % | 200 | 8 | FO | 4.64 | 65.7 | 53.6 | 42.0 |
| Hydroxyapatite 17.5 wt. % | 200 | 8 | AL | 6.21 | 54.0 | 37.9 | 22.3 |
| Hydroxyapatite 15 wt % | 200 | 8 | AL | 10.36 | 23.3 | N/A | N/A |

| Material | Booster (g) | Dia. (in.) | Fuel | Sp. Imp. (kPa · ms/kg) | Reduction vs. 13.5 Baseline (%) | Reduction vs. 10.0 Baseline (%) | Reduction vs. 8.0 Baseline (%) |
|---|---|---|---|---|---|---|---|
| Hydroxyapatite 12.5 wt % | 200 | 8 | FO | 5.45 | 59.6 | 45.5 | 31.9 |
| Hydroxyapatite 12.5 wt % | 200 | 8 | FO | 5.57 | 58.7 | 44.3 | 30.3 |
| Hydroxyapatite 15 wt. % + bauxite residue 5 wt % | 200 | 8 | AL | 8.88 | 34.3 | 11.2 | N/A |
| Hydroxyapatite 15 wt. % + bauxite residue 5 wt. % | 450 | 12 | AL | 8.63 | 36.1 | 13.7 | N/A |
| Hydroxyapatite 10 wt. % + bauxite residue 10 wt. % | 200 | 8 | FO | 4.17 | 69.1 | 58.3 | 47.8 |
| Hydroxyapatite 10 wt. % + bauxite residue 10 wt. % | 200 | 8 | FO | 5.34 | 60.5 | 46.6 | 33.3 |
| Hydroxyapatite 10 wt. % + bauxite residue 10 wt. % | 200 | 8 | FO | 11.38 | 15.7 | N/A | N/A |
| Hydroxyapatite 10 wt. % + bauxite residue 10 wt. % | 200 | 8 | FO | 7.16 | 47.0 | 28.4 | 10.5 |
| Hydroxyapatite 5 wt. % + bauxite residue 15 wt. % | 200 | 8 | FO | 4.82 | 64.3 | 51.8 | 39.8 |
| Hydroxyapatite 5 wt. % + bauxite residue 15 wt. % | 200 | 8 | FO | 4.93 | 63.5 | 50.7 | 38.4 |
| Hydroxyapatite 2.5 wt % + bauxite residue 17.5 wt % | 200 | 8 | FO | 14.17 | N/A | N/A | N/A |
| Hydroxyapatite 2.5 wt % + bauxite residue 17.5 wt % | 200 | 8 | FO | 13.64 | N/A | N/A | N/A |
| Hydroxyapatite 2.5 wt % + bauxite residue 17.5 wt % | 200 | 8 | FO | 4.59 | 66.0 | 54.1 | 42.7 |
| Hydrotalcite 17.5 wt. % + bauxite residue 2.5 wt. % | 200 | 8 | AL | 5.03 | 62.8 | 49.7 | 37.2 |
| Hydrotalcite 15 wt. % + bauxite residue 5 wt. % | 200 | 8 | AL | 8.86 | 34.3 | 11.4 | N/A |
| Hydrotalcite 15 wt. % + bauxite residue 5 wt. % | 450 | 12 | AL | 12.31 | 8.8 | N/A | N/A |
| Hydrotalcite 10 wt. % + bauxite residue 10 wt % | 200 | 8 | FO | 13.79 | N/A | N/A | N/A |
| Hydrotalcite 10 wt. % + bauxite residue 10 wt % | 200 | 8 | FO | 4.44 | 67.1 | 55.6 | 44.5 |
| Hydrotalcite 10 wt. % + bauxite residue 10 wt % | 200 | 8 | FO | 13.45 | 0.4 | N/A | N/A |
| Hydrotalcite 10 wt. %, bauxite residue 5 wt % | 200 | 8 | FO | 14.05 | N/A | N/A | N/A |
| Hydrotalcite 10 wt. % + bauxite residue 5 wt. % | 200 | 8 | FO | 12.75 | 5.6 | N/A | N/A |
| Hydrotalcite 5 wt % + bauxite residue 15 wt % | 200 | 8 | FO | 5.86 | 56.6 | 41.4 | 26.8 |
| Hydrotalcite 5 wt % + bauxite residue 15 wt % | 200 | 8 | FO | 14.05 | N/A | N/A | N/A |
| Hydrotalcite 5 wt % + bauxite residue 15 wt % | 200 | 8 | FO | 10.48 | 22.3 | N/A | N/A |
| Hydrotalcite 2.5 wt. % + bauxite residue 17.5 wt % | 200 | 8 | FO | 15.18 | N/A | N/A | N/A |
| Hydrotalcite 2.5 wt. % + bauxite residue 17.5 wt % | 200 | 8 | FO | 15.61 | N/A | N/A | N/A |
| Hydrotalcite 2.5 wt. % + bauxite residue 17.5 wt % | 200 | 8 | FO | 14.82 | N/A | N/A | N/A |
| Hydrotalcite 10 wt. %, Hydroxyapatite 5 wt % | 200 | 8 | AL | 19.81 | N/A | N/A | N/A |
| Hydroxyapatite 10 wt. % + Hydrotalcite 5 wt % + bauxite residue 5 wt % | 450 | 12 | AL | 4.52 | 66.5 | 54.8 | 43.5 |
| Hydrotalcite 10 wt. % + hydroxyapatite 5 wt % + bauxite residue 5 wt. % | 450 | 12 | AL | 7.84 | 42.0 | 21.6 | 2.1 |

Example: Blast Test—Blast Suppression and Desensitization

The below table illustrates experimental results from blast tests completed on various materials, in which stabilizer and combinations of stabilizers and fillers were evaluated against a control SI baseline (ammonium nitrate). Materials evaluated for this blast test included: fire clay (individually and in combination with bauxite residue at different weight percentages), hydroxyapatite (individually and in combination with bauxite residue at different weight percentages), and hydrotalcite (individually and in combination with bauxite residue at different weight percentages).

It is noted that fire clay was utilized as a diluents (in lieu of bauxite residue). The fire clay was obtained from a commercial vendor, and fire clay refers to a calcined commercial clay product that is an inert alumino-silicate material (e.g. applications in mortar/ceramic bricks, and refractory lining for furnaces and chimneys).

It is noted that EG AN refers to explosive grade ammonium nitrate, which is a low density AN made for improved explosive performance (e.g. as compared to the high density AN optimized for Fertilizer Grade FG.)

For this blast test, the hydrotalcite and hydroxyapatite were recovered from an alumina production process. The standard operating procedure was followed to prepare the blast components and complete the blast tests, though the diameter of the blast components was set at a standard 8". Other variables were modified, including the amount of booster (200 g, 400 g), and the type of fuel (i.e. fuel oil (FO), AL (aluminum), and PS (powdered sugar)).

The specific impulse readings are provided below, along with a comparative view of the Reduction in Blast, measured as a percentage according to various SI baselines (e.g. 13.5, 10.0, and 8.0). When a blast test did not result in a reduction in specific impulse, the reduction percentage is indicated as "N/A".

| Material | Booster (g) | Fuel | Sp. Imp. (kPa · ms/kg) | Reduction vs. 13.5 Baseline (%) | Reduction vs. 10.0 Baseline (%) | Reduction vs. 8.0 Baseline (%) |
|---|---|---|---|---|---|---|
| Ammonium Nitrate (control) | 200 | PS | 11.28 | 16.5 | N/A | N/A |
| Ammonium Nitrate (control) | 200 | PS | 11.06 | 18.0 | N/A | N/A |
| Ammonium Nitrate (control) | 200 | AL | 15.39 | N/A | N/A | N/A |
| Fire Clay 25 wt % | 200 | FO | 6.39 | 52.7 | 36.1 | 20.2 |
| Fire Clay 25 wt % | 200 | FO | 11.17 | 17.2 | N/A | N/A |
| Hydroxyapatite 17.5 wt % | 200 | FO | 2.66 | 80.3 | 73.4 | 66.8 |
| Hydroxyapatite 17.5 wt % | 200 | FO | 2.71 | 79.9 | 72.9 | 66.2 |
| Hydroxyapatite 17.5 wt. % | 200 | FO | 4.70 | 65.2 | 53.0 | 41.2 |
| Hydroxyapatite 17.5 wt % | 200 | AL | 4.97 | 63.2 | 50.3 | 37.8 |
| Hydroxyapatite 15 wt. % | 400 | FO | 5.97 | 55.8 | 40.3 | 25.4 |
| Hydroxyapatite 15 wt. % | 200 | FO | 4.69 | 65.2 | 53.1 | 41.4 |
| Hydroxyapatite 15 wt. % | 200 | FO | 5.62 | 58.4 | 43.8 | 29.7 |
| Hydroxyapatite 15 wt % | 200 | FO | 12.94 | 4.1 | N/A | N/A |
| Hydroxyapatite 15 wt % | 200 | AL | 8.98 | 33.5 | 10.2 | N/A |
| Hydroxyapatite 12.5 wt. % | 400 | FO | 10.39 | 23.0 | N/A | N/A |
| Hydroxyapatite 12.5 wt. % | 200 | FO | 4.87 | 64.0 | 51.3 | 39.2 |
| Hydroxyapatite 12.5 wt. % | 200 | FO | 9.58 | 29.1 | 4.2 | N/A |
| Hydroxyapatite 12.5 wt. % | 200 | FO | 1.95 | 85.6 | 80.5 | 75.7 |
| Hydroxyapatite 10 wt. % | 200 | FO | 11.93 | 11.6 | N/A | N/A |
| Hydroxyapatite 10 wt. % | 200 | FO | 11.70 | 13.3 | N/A | N/A |
| Hydroxyapatite 15 wt % + bauxite residue 2.5 wt % | 200 | PS | 2.41 | 82.2 | 75.9 | 69.9 |
| Hydroxyapatite 15 wt. % + bauxite residue 5 wt. % | 200 | FO | 4.39 | 67.5 | 56.1 | 45.1 |
| Hydroxyapatite 15 wt. % + bauxite residue 5 wt. % | 200 | FO | 2.13 | 84.2 | 78.7 | 73.4 |
| Hydroxyapatite 15 wt. % + bauxite residue 5 wt. % | 200 | FO | 3.88 | 71.3 | 61.2 | 51.5 |
| Hydroxyapatite 12.5 wt % + bauxite residue 2.5 wt % | 200 | FO | 10.58 | 21.6 | N/A | N/A |
| Hydroxyapatite 12.5 wt. % + bauxite residue 2.5 wt. % | 200 | FO | 5.30 | 60.8 | 47.0 | 33.8 |
| Hydroxyapatite 12.5 wt. % + bauxite residue 2.5 wt. % | 200 | FO | 4.11 | 69.6 | 58.9 | 48.6 |
| Hydroxyapatite 12.5 wt. % + bauxite residue 5 wt % | 200 | FO | 3.33 | 75.3 | 66.7 | 58.4 |
| Hydroxyapatite 12.5 wt. % + bauxite residue 5 wt % | 200 | FO | 4.00 | 70.4 | 60.0 | 50.0 |
| Hydroxyapatite 12.5 wt. % + bauxite residue 7.5 wt % | 400 | FO | 6.27 | 53.6 | 37.3 | 21.6 |
| Hydroxyapatite 12.5 wt. % + bauxite residue 7.5 wt. % | 200 | FO | 3.94 | 70.8 | 60.6 | 50.7 |
| Hydroxyapatite 12.5 wt. % + bauxite residue 7.5 wt % | 200 | FO | 3.75 | 72.2 | 62.5 | 53.2 |
| Hydroxyapatite 10 wt. % + EG AN | 400 | FO | 13.18 | 2.4 | N/A | N/A |
| Hydroxyapatite 10 wt. % + EG AN | 400 | FO | 12.34 | 8.6 | N/A | N/A |
| Hydrotalcite 26 wt % | 200 | AL | 2.42 | 82.0 | 75.8 | 69.7 |
| Hydrotalcite 15 wt. % | 200 | FO | 5.71 | 57.7 | 42.9 | 28.6 |
| Hydrotalcite 12.5 wt. % | 200 | FO | 9.21 | 31.8 | 7.9 | N/A |
| Hydrotalcite 17.5 wt. % + bauxite residue 2.5 wt. % | 200 | FO | 1.68 | 87.5 | 83.2 | 79.0 |
| Hydrotalcite 17.5 wt. % + bauxite residue 2.5 wt. % | 200 | FO | 1.01 | 92.5 | 89.9 | 87.4 |
| Hydrotalcite 17.5 wt. % + bauxite residue 2.5 wt. % | 200 | FO | 1.21 | 91.0 | 87.9 | 84.8 |
| Hydrotalcite 17.5 wt % + bauxite residue 2.5 wt. % | 200 | AL | 3.71 | 72.5 | 62.9 | 53.6 |
| Hydrotalcite 15 wt. % + bauxite residue 2.5 wt. % | 400 | FO | 2.78 | 79.4 | 72.2 | 65.2 |
| Hydrotalcite 15 wt. % + bauxite residue 2.5 wt. % | 400 | FO | 1.38 | 89.8 | 86.2 | 82.8 |
| Hydrotalcite 15 wt. % + bauxite residue 2.5 wt. % | 200 | FO | 1.50 | 88.9 | 85.0 | 81.3 |

-continued

| Material | Booster (g) | Fuel | Sp. Imp. (kPa · ms/kg) | Reduction vs. 13.5 Baseline (%) | Reduction vs. 10.0 Baseline (%) | Reduction vs. 8.0 Baseline (%) |
| --- | --- | --- | --- | --- | --- | --- |
| Hydrotalcite 15 wt. % + bauxite residue 2.5 wt % | 200 | FO | 2.84 | 79.0 | 71.6 | 64.5 |
| Hydrotalcite 15 wt. % + bauxite residue 2.5 wt % | 200 | FO | 3.31 | 75.5 | 66.9 | 58.7 |
| Hydrotalcite 15 wt % + bauxite residue 2.5 wt % | 200 | FO | 5.04 | 62.6 | 49.6 | 37.0 |
| Hydrotalcite 15 wt. % + bauxite residue 5 wt % | 200 | FO | 3.80 | 71.9 | 62.0 | 52.5 |
| Hydrotalcite 15 wt. % + bauxite residue 5 wt % | 200 | FO | 2.47 | 81.7 | 75.3 | 69.2 |
| Hydrotalcite 15 wt. % + bauxite residue 5 wt. % | 200 | FO | 9.95 | 26.3 | 0.5 | N/A |
| Hydrotalcite 15 wt % + bauxite residue 5% | 200 | AL | 4.93 | 63.5 | 50.7 | 38.4 |
| hydrotalcite 15 wt % + bauxite residue 5 wt % | 200 | PS | 3.47 | 74.3 | 65.3 | 56.7 |
| Hydrotalcite 12.5 wt % + bauxite residue 2.5 wt % | 200 | FO | 4.22 | 68.8 | 57.8 | 47.3 |
| Hydrotalcite 12.5 wt % + bauxite residue 2.5 wt % | 400 | FO | 5.17 | 61.7 | 48.3 | 35.3 |
| Hydrotalcite 12.5 wt % + bauxite residue 2.5 wt % | 200 | FO | 8.55 | 36.7 | 14.5 | N/A |
| Hydrotalcite 12.5 wt % + bauxite residue 5 wt % | 200 | FO | 3.39 | 74.9 | 66.1 | 57.7 |
| Hydrotalcite 12.5 wt % + bauxite residue 5 wt % | 200 | FO | 9.66 | 28.4 | 3.4 | N/A |
| hydrotalcite 12.5 wt % + bauxite residue 5 wt % | 200 | FO | 3.71 | 72.5 | 62.9 | 53.7 |
| Hydrotalcite 12.5 wt % + bauxite residue 7.5 wt % | 400 | FO | 3.74 | 72.3 | 62.6 | 53.2 |
| Hydrotalcite 12.5 wt % + bauxite residue 7.5 wt % | 200 | FO | 3.41 | 74.8 | 65.9 | 57.4 |
| Hydrotalcite 12.5 wt. % + bauxite residue 7.5 wt. % | 200 | FO | 10.54 | 21.9 | N/A | N/A |
| Hydrotalcite 10 wt. % + bauxite residue 2.5 wt. % | 200 | FO | 12.84 | 4.9 | N/A | N/A |
| Hydrotalcite 10 wt. % + bauxite residue 2.5 wt. % | 200 | FO | 11.83 | 12.4 | N/A | N/A |
| Hydrotalcite 10 wt. % + bauxite residue 5 wt. % | 400 | FO | 3.63 | 73.1 | 63.7 | 54.6 |
| Hydrotalcite 10 wt. % + bauxite residue 5 wt. % | 200 | FO | 3.78 | 72.0 | 62.2 | 52.8 |
| Hydrotalcite 10 wt. % + bauxite residue 7.5 wt. % | 200 | FO | 10.26 | 24.0 | N/A | N/A |
| Hydrotalcite 10 wt. % + bauxite residue 7.5 wt. % | 400 | FO | 10.07 | 25.4 | N/A | N/A |
| Hydrotalcite 10 wt. % + bauxite residue 10 wt. % | 200 | FO | 11.66 | 13.7 | N/A | N/A |
| Hydrotalcite 10 wt. % + bauxite residue 10 wt. % | 200 | FO | 11.55 | 14.4 | N/A | N/A |

Example: Intercalation of Hydrotalcite

In order to intercalate hydrotalcites, the following procedure was performed, were anion substitution is completed by thermal activation followed by rehydration.

For thermal activation, 4.25 kg of HTC powder is placed in a ceramic bowl (to a depth of 1") and heated to a temperature of 450° C. for one hour, followed by cooling below 100° C. in a furnace or in an external holding unit (drying cabinet, desiccators).

For rehydration, approximately 12 L of water (DI or distilled) is stirred in a container, followed by phosphate addition (using diammonium phosphate (DAP) add 1.6 kg (12 moles) to the 12 L of water) and mix until phosphate salt is dissolved (20-30 minutes). Slowly, activated HTC powder was added and the resulting mixture is stirred for a minimum of 12 hours. The wet slurry was placed in pans of ¾" to 1" depth and put into a drying oven and dried at 125° C. until dry solids are obtained. The resulting intercalated HTC is screened to <20 mesh and stored for use in the blast tests.

Example: Bauxite Residue Preparation as Stabilizer Material

In order to neutralize bauxite residue, phosphoric acid (85%) was added to a BR slurry, while being mixed by an agitator. The pH of the bauxite residue was lowered to less than 8.0. The bauxite residue was permitted to settle and the resulting liquid was poured from the top of the mixture and the resulting mixture was poured to ½ inch thick pans, and oven dried (100° C.). The resulting bauxite residue is believed to have a phosphate content of from 5 wt. % to not greater than about 10 wt. % based on the phosphoric acid neutralization.

Example: Preparation of Bauxite Samples

Raw Bauxite ore was reduced down to +/−20 mesh by feeding the ore through a plate crusher, a roll crusher with serrated rolls (Sturtevant roll crusher), and a ball mill (with ceramic balls to further reduce the particles to usable fractions. The resulting 20 mesh fraction was blended with ammonium nitrate material and blast tests were conducted in accordance with the above-referenced Example.

Example: Apatite Preparation from Bayer Liquor

Apatite tested in accordance with the aforementioned example was made with precursor materials phosphoric acid, slaked lime and Bayer liquor, as per the following process. A mixture of phosphoric acid, carbon dioxide, and refinery spent Bayer liquor was heated to 70° C. (In some embodiments, add additional carbonate or phosphate to increase yield. In some embodiments, an alternative phosphorous source is crandalite.) Next, slaked lime was added and stirred for 15-30 minutes. The resulting mixture was filtered, washed and oven dried. After preparation, entrained liquor was removed via an additional filtration and washing step.

The resulting material tested in accordance with the aforementioned Example had the following phases: carbonate hydroxyl apatite (major), hydroxyl apatite (trace), and possible trace quantities of $CaCO_3$ & hydrotalcite (e.g. formed via impurities in the slaked lime or formed during the apatite production process).

The apaptite tested in accordance with aforementioned Examples is a Bayer carbonate hydroxyapatite of the following formula $(Ca_7Na_2(PO_4)_3(CO_3)_3(H_2O)_3OH)$ with major element as follows: 12-22 wt % $CO_2$; 44-49 wt. % CaO; 19-26 wt. % $P_2O_5$; 7-12 wt. % $Na_2O$; and 1-3 wt. % $Al_2O_3$.

Example: Methods for Making Fertilizer Composition

Ammonium nitrate is manufactured in three steps, including: (1) neutralizing nitric acid with ammonia to produce a concentrated solution; (2) evaporating to provide a melt; and (3) processing by prilling or granulation to provide the commercial solid ammonium nitrate product. Prilling is the formation of a rounded, granular solid by allowing molten droplets to fall through a fluid cooling medium. In one embodiment, prilling of AN involves spraying the concentrated solution (i.e. 96-99+%) solution into the top of a large tower. Then, the descending droplets are cooled by an upward flow of air, solidifying into spherical prills that are collected at the bottom of the tower.

In one embodiment, fertilizer compositions of the instant disclosure are made by spraying the concentrated AN solution (i.e. 96-99+%) while simultaneously spraying a concentrated solution of the stabilizer material(s) (e.g. suspended or in solution in a solvent) and co-prilling the resulting fertilizer composition.

In one embodiment, fertilizer compositions of the instant disclosure are made by adding the stabilizer material(s) to the concentrated ammonium nitrate solution prior to prilling.

In one embodiment, fertilizer compositions of the instant disclosure are made by coating the stabilizer material(s) onto the prill after the AN prill is formed. In some embodiments, a drum roller is used (e.g. with optional solvents and/or binders) to adhere and/or coat the stabilizer material(s) onto the AN prill.

In some embodiments, the stabilizer material(s) are mixed into the ammonium nitrate solution (with optional solvents) and the resulting fertilizer composition is recrystallized from solution or suspension.

In some embodiments, AN prills are ground with stabilizer material(s) in a milling press and utilized in a powder form. In some embodiments, the powder is mixed with binder(s) and rolled into agglomerated forms. In some embodiments, the blended powder is mixed with a binder and formed (e.g. pressed) into pellets or plates (e.g. with a disk-press or pelletization process).

In some embodiments, the solution (or suspension) of ammonium nitrate with stabilizer materials (e.g. optionally with solvents to reduce viscosity) are spray dried.

In some embodiments, the solution (or suspension) of ammonium nitrate with stabilizer material(s) is agglomerated (e.g. pan agglomeration), followed by a pelletization process.

Example: Method of Making Fertilizer

The following procedure was utilized to form ammonium nitrate coated in hydrotalcite. Subsequently, this coated fertilizer was utilized in the crop studies (crop study #1).

As received ammonium nitrate fertilizer (AN) was added to an electric cement mixer, ceramic balls were added, and the AN was mixed for 2.5 hours. The material was then screened to separate the AN (deagglomerated AN) from the ceramic balls.

A composition of 80% ammonium nitrate: 20% hydrotalcite was screened together to mix the materials, and processed in the ceramic mixer for 30 minutes to blend the materials. The blended material was slowly added to a drum roller (pelletizing machine/fertilizer granulator), which was operated at a pre-set angle and speed, while binder (water) was slowly added in a fine mist to the blended mixture. As the water was added, the blended mixture formed pellets. In alternating fashion, blended fertilizer material and water were sequentially added to the drum roller and were formed into pellets. As the pellets rolled through the drum roller and increased in size and density, the pellets reached a suitable weight to roll out of the drum roller into a collection area.

Example Crop Studies

Two crop studies were completed utilizing fertilizer compositions in accordance with one or more embodiments of the instant disclosure, in order to evaluate how fertilizer compositions including stabilizer materials performed in comparison to commercially available fertilizers.

Statistical analysis was performed on the crop yields, with the basic analysis procedure as follows: test whether the variability differs across the treatments; test whether the averages differ across the treatments (e.g. using the appropriate method determined by whether (1) is true or false); and if at least two averages can be shown to be different, identify which treatments differ. The statistical evaluation yielded that The first crop study consisted of 1 fertilizer composition treatment (pelletized HTC with AN, (26-0-0)) and 5 Controls (no treatment (N/A), AN fertilizer (34-0-0), Urea fertilizer (46-0-0), UAN (liquid) fertilizer (30-0-0), and ESN fertilizer (44-0-0) (a commercially available polymer coated urea fertilizer)). Each treatment was applied with an equivalent Nitrogen delivery of 100 and 140 (lbs N/Acre). Two responses were measured: Ears/Acre, and Weight/Acre. In comparing the two responses, it was determined that there are no statistically significant differences between the fertilizer composition (HTC+AN) compared to the commercially available fertilizer controls and no fertilizer addition. For the first crop study, there were no observable differences (in Ears/Acre or Weight/Acre) between the fertilizer composition, nitrogen-bearing controls, or non-nitrogen control, nor between low and high nitrogen levels of the same product.

The second crop study consisted of 3 fertilizer composition treatments and 5 Controls. Controls included: ammonium nitrate fertilizer, urea fertilizer, UAN fertilizer (liquid application), no fertilizer application, and ESN fertilizer (commercially available polymer coated urea product). Three fertilizer compositions included: fertilizer #1: AN having by weight, 5% bauxite residue, and 15% hydrotalcite; fertilizer #2: AN having by weight, 5% bauxite residue and 15% apatite; and fertilizer #3: AN having by weight, 5% bauxite residue, 10% hydrotalcite, and 5% apatite. Each Treatment was applied with 120 Lbs N/Acre and the Alcoa and AN Treatments were also applied at 261 Lbs Product/Acre. One response was measured: Yield @ 15.5% Moisture (Bushels/Acre).

In viewing the response, all products show higher yield (bushels/acre) than the non-nitrogen control. In completing the statistical analysis on the response, it was determined that there are no statistically significant differences between the fertilizer compositions compared to the commercially available fertilizer controls and no fertilizer addition (i.e. it is possible to distinguish some of the high N treatments from some of the low N treatments, but it is not possible to distinguish among the high N or among the low N treatments).

Various ones of the inventive aspects noted herein above may be combined to yield fertilizer compositions and methods of making and using the same to fertilize soil, while preventing, reducing, or eliminating the fertilizer (AN fertilizer) from being used in explosives and/or improvised explosive devices.

While various embodiments of the instant disclosure have been described in detail, it is apparent that modifications and adaptations of those embodiments will occur to those skilled in the art. However, it is to be expressly understood that such modifications and adaptations are within the spirit and scope of the instant disclosure.

What is claimed is:

1. A fertilizer composition, comprising:
   an ammonium nitrate material; and
   an effective amount of a stabilizer material to result in a specific impulse of not greater than 13.5 kPa*ms/kg when measured in accordance with a blast propagation test;
   wherein the stabilizer material comprises a layered double hydroxide, wherein the layered double hydroxide is hydromagnesite, and
   wherein the stabilizer material is at least 5 wt. % of the fertilizer composition.

2. The composition of claim 1, wherein the stabilizer material in the fertilizer composition comprises an additive.

3. The fertilizer of claim 1, further comprising a filler material, wherein the filler material is selected from the group consisting of: bauxite residue, fire clay, red lime, and combinations thereof.

4. The fertilizer composition of claim 1, wherein the stabilizer composition is at least 10 wt. % of the total fertilizer composition.

5. The fertilizer composition of claim 4, wherein the stabilizer composition is at least 12.5 wt. % of the total fertilizer composition.

6. The fertilizer composition of claim 5, wherein the stabilizer composition is at least 15 wt. % of the total fertilizer composition.

7. The fertilizer composition of claim 6, wherein the stabilizer composition is at least 20 wt. % of the total fertilizer composition.

8. The fertilizer material of claim 1, wherein the stabilizer material is no greater than 25 wt. % of the total fertilizer composition.

9. The fertilizer composition of claim 1, wherein the fertilizer composition is configured as a mesh size of not greater than 100.

10. The fertilizer composition of claim 9, wherein the fertilizer composition is configured as a mesh size of between 4 and 20.

11. The fertilizer composition of claim 1, wherein the fertilizer composition comprises a form selected from the group consisting of: pellets; prills; granules; powder; disks; and combinations thereof.

12. The fertilizer composition of claim 1, wherein the fertilizer composition comprises a homogenous mixture.

13. The fertilizer composition of claim 1, wherein the fertilizer composition comprises a heterogeneous mixture.

14. The fertilizer composition of claim 1, wherein the fertilizer composition comprises at least one coating.

15. The fertilizer composition of claim 1, wherein the fertilizer composition comprises a blast suppressant fertilizer.

16. The fertilizer composition of claim 1, further comprising a desensitized fertilizer.

17. The fertilizer composition of claim 1, further comprising a plant nutrient selected from the group consisting of: N, P, K, Mg, Ca, Fe, Mn, and combinations thereof.

18. The fertilizer composition of claim 1, further comprising a binder.

19. The fertilizer composition of claim 1, wherein the stabilizer material is a Bayer process byproduct.

20. The fertilizer composition of claim 1, wherein the stabilizer material is naturally occurring.

* * * * *